United States Patent [19]

Zapp

[11] 4,198,114
[45] Apr. 15, 1980

[54] MAGNIFYING OPTICAL SYSTEM

[75] Inventor: Walter Zapp, Oberegg, Switzerland

[73] Assignee: Createchnic Patent AG, Dietlikon, Switzerland

[21] Appl. No.: 871,800

[22] Filed: Jan. 24, 1978

[30] Foreign Application Priority Data

Jan. 26, 1977 [CH] Switzerland .............. 916/77

[51] Int. Cl.² .......................................... G02B 23/02
[52] U.S. Cl. .................................. 350/36; 350/51; 350/72; 350/146; 350/248
[58] Field of Search ............... 350/20, 32, 36, 51, 350/53, 72, 145, 146, 248, 249

[56] References Cited

U.S. PATENT DOCUMENTS

| 1,610,553 | 12/1926 | Jones ............................... 350/72 |
| 2,935,910 | 5/1960 | Schmidt ........................... 350/146 |
| 3,229,570 | 1/1966 | Erban .............................. 350/20 X |
| 3,298,770 | 1/1967 | Rosendahl ....................... 350/36 |

FOREIGN PATENT DOCUMENTS

Ad.67038 11/1957 France ............................ 350/72

*Primary Examiner*—John K. Corbin
*Assistant Examiner*—Mathew W. Koren
*Attorney, Agent, or Firm*—Heinrich W. Herzfeld; Gilbert L. Wells

[57] ABSTRACT

A magnifying optical system is described which is usable at a determined posture of the head of a user, when at least one of the user's eyes is directed onto an object's field to be magnified, which system comprises an objective, an ocular comprising an eye lens and at least one field lens, and a deflecting system interposed between the objective and the ocular, the optical system being located, at the determined head posture, outside the straight path of rays for free sight between the user's eye and the object's field looked at by the eye; the optical axis of the objective is directed toward the center of the object's field, the optical axis of the eye lens of the ocular is directed toward the center of the user's eye ball, both said optical axes forming an obtuse angle with one another, which optical axis of the objective and the central ray of free sight intersect one another under a flat acute angle at the center of the object's field (whereby the object's field can alternatingly been seen by the user either magnified by the said system or freely past the latter, while the user retains the same head posture.)

22 Claims, 33 Drawing Figures

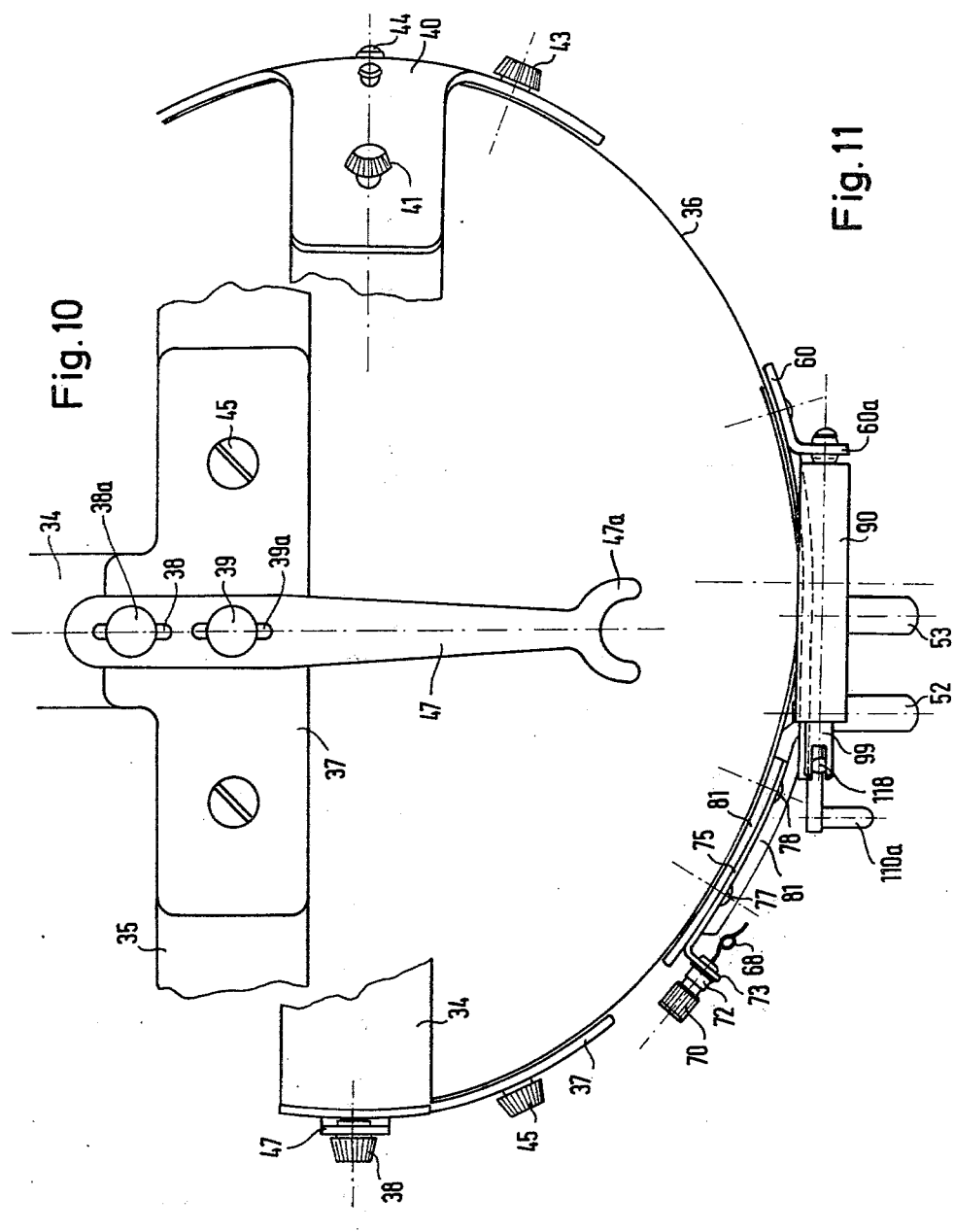

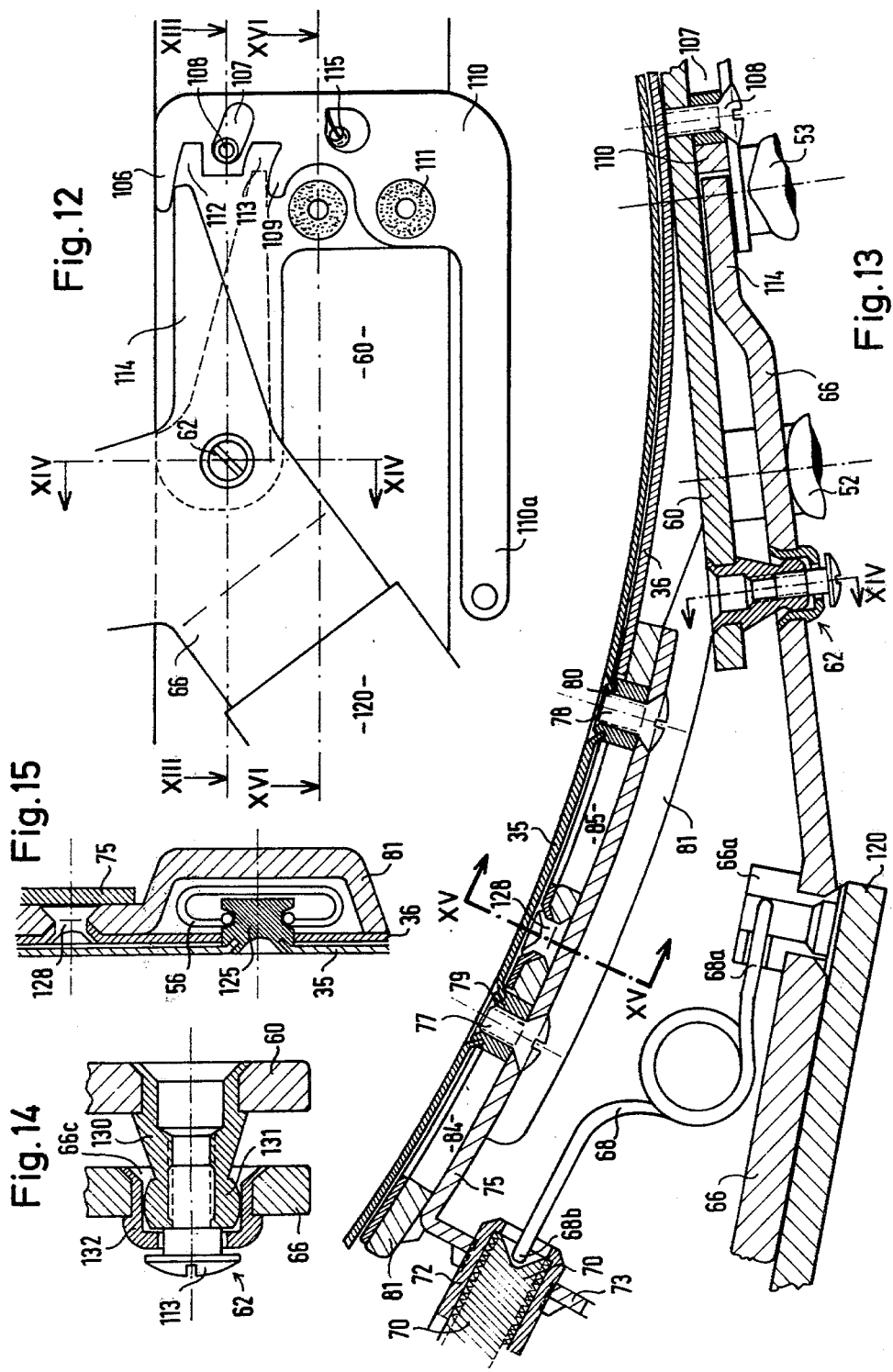

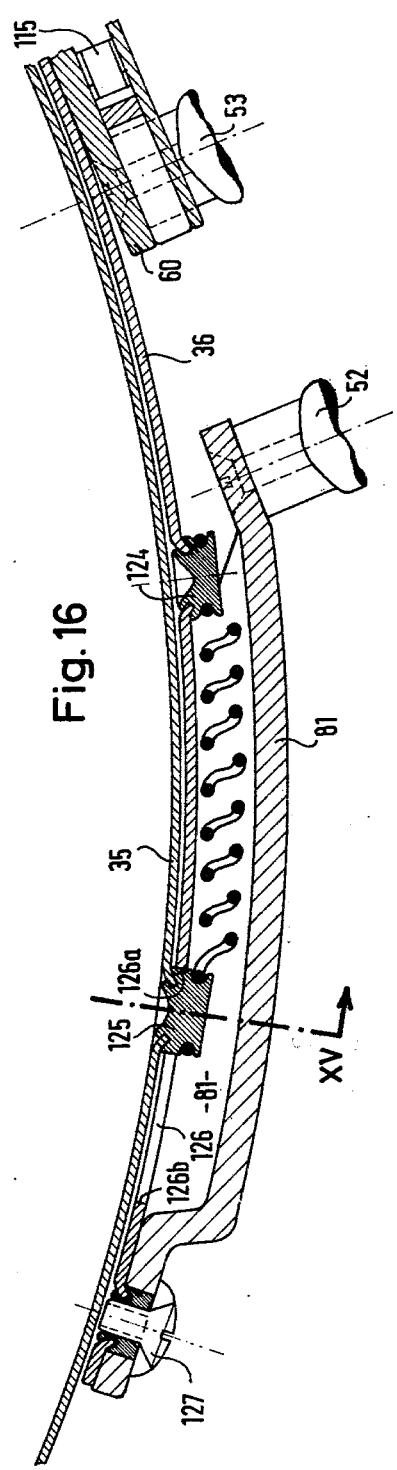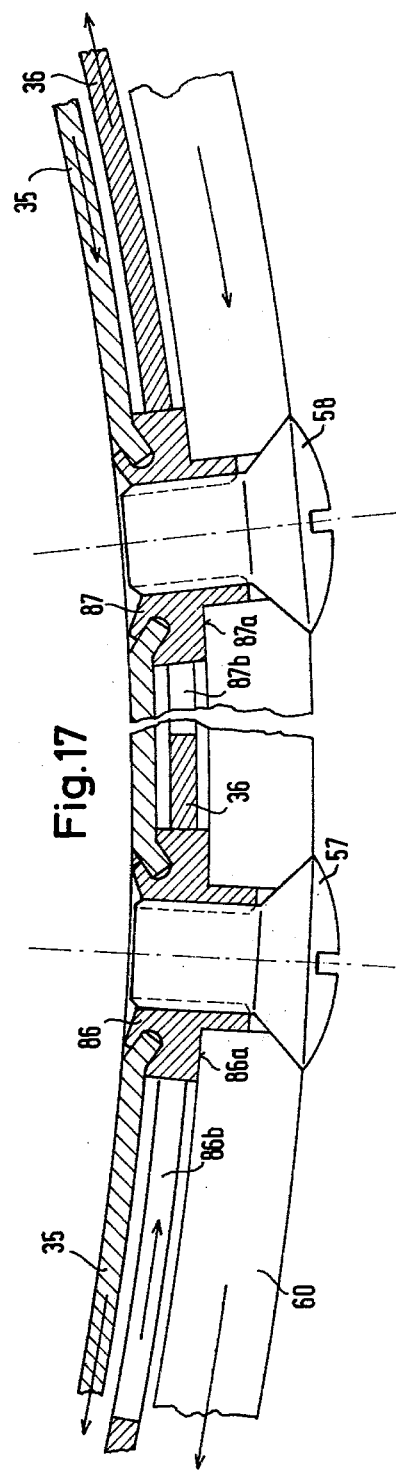

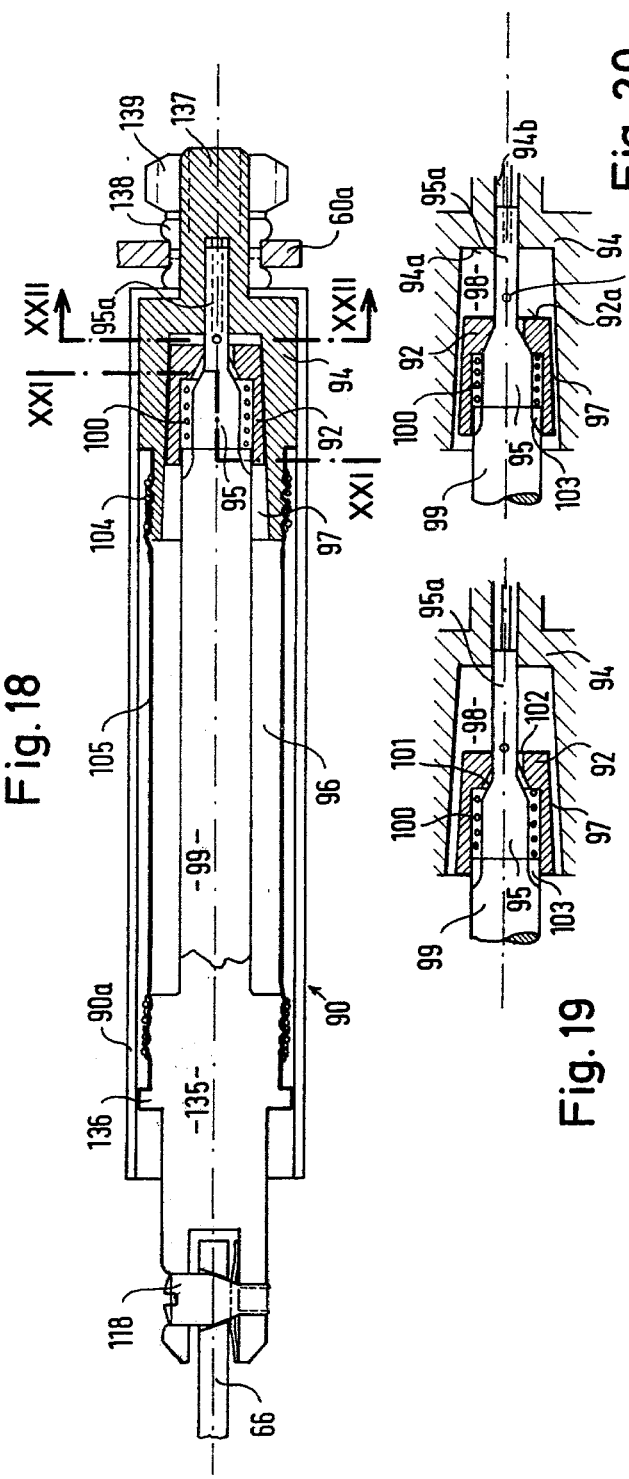

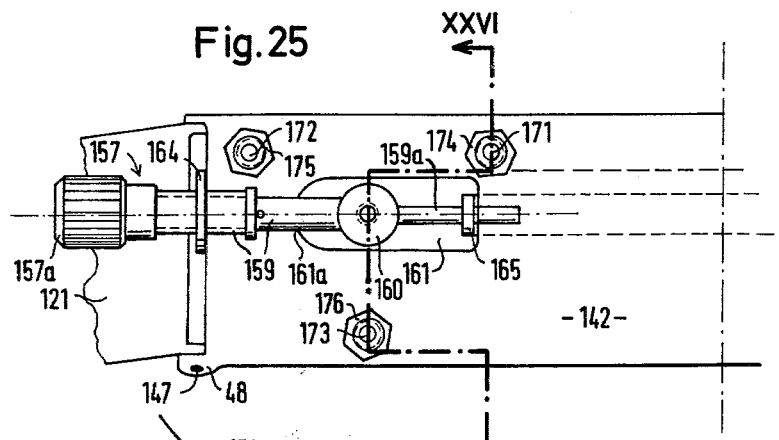
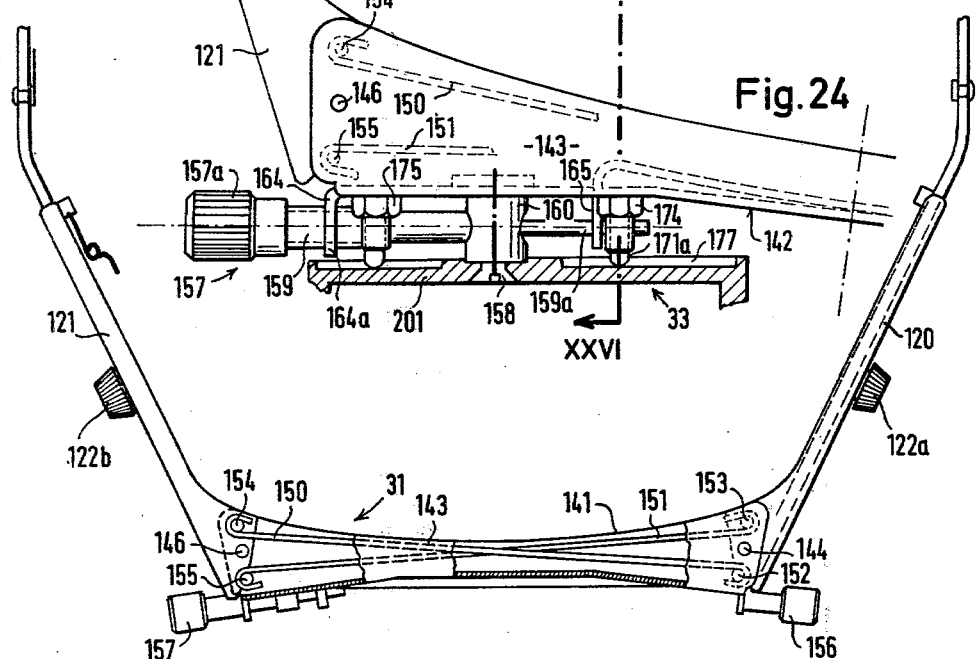
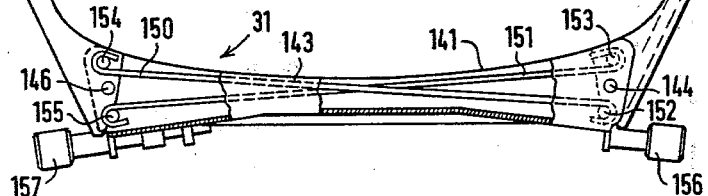

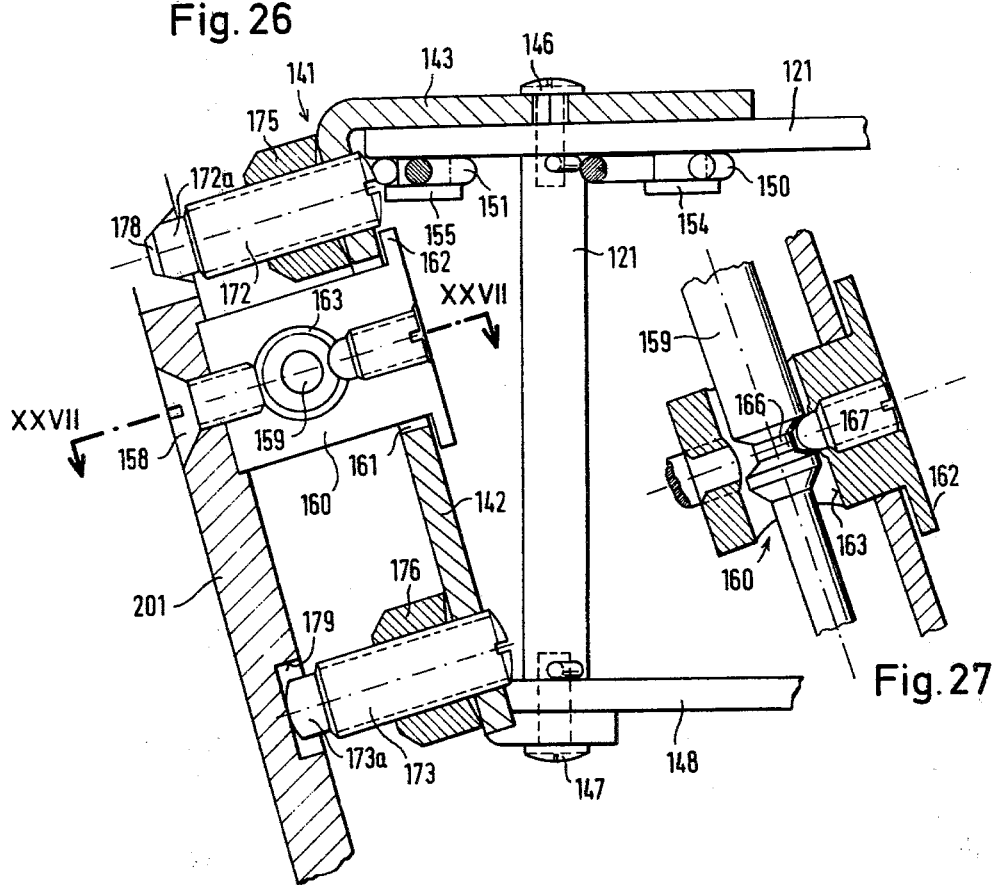

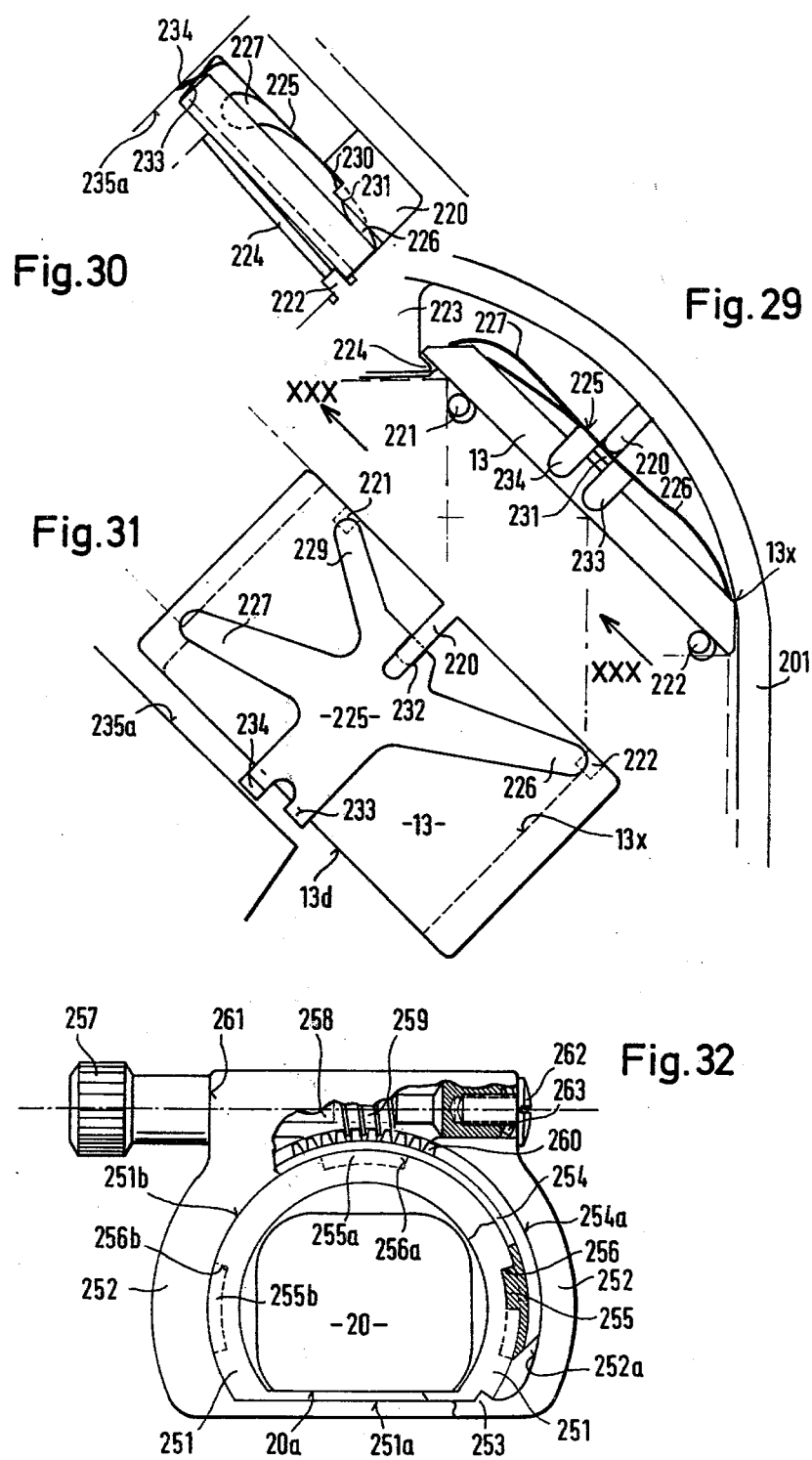

MAGNIFYING OPTICAL SYSTEM

BACKGROUND OF THE INVENTION

This invention relates to a magnifying optical system which can be used with a determined posture of the head of a user, in which at least one of the user's eyes is directed onto an object's field, which system comprises an objective, an ocular comprising an eye lens (or eyepiece) and a deflecting (or deviating) system interposed between these.

Such a system, which is disclosed, inter alia, in German Patent Nos. 1,239,869 and 1,497,664 to Walter Zapp, is used as a telescope or magnifying glass.

Magnifying optical systems include above all the conventional microscope. However, there are applications of the latter, where it is necessary for the user to view one and the same object, with minimum possible interruptions, in continuous alternation through the microscope and immediately afterwards with the unaided eye, then again through the microscope and again with the unaided eye, and so on. The durations of viewing the object in question through the microscope and with the unaided eye are of varying length, independent of one another, and irregular.

Such alternate viewing by the observer is in particular necessary for a watchmaker in the watch industry. It is well known that a watchmaker must, completely irregularly, view the watch on which he is working sometimes through a magnifying glass and sometimes with the unaided eye if he is assembling or dismantling a watch mechanism comprising numerous small parts, for example the mechanism of a ladies' wristwatch. Frequently, the "aiding" and "restoring to normal" of the eye is effected by the watchmaker alternately manually placing in front of the eye a magnifying glass which he carries on his forehead by means of a head-band, and again manually pushing the magnifying glass away from the eye and up on the forehead.

In doing so, he must unavoidably lose sight of the precise position of the watch mechanism which he wishes to view, and must look for this position again each time he has changed his method of viewing.

A further field of use, in which "alternate viewing" by the observer, of the type described above, is necessary, is that of neuro-surgery. In brain operations and similar neuro-surgical operations, the surgeon carrying out the operation must be in the position to view a very small zone of surgery from time to time by irregular "alternate viewing" through a microscope interspersed with viewing with the unaided eye. The difficulties encountered are similar to those which confront a watchmaker when he works with a magnifying glass.

OBJECTS AND SUMMARY OF THE INVENTION

It is therefore an object of the invention to provide a magnifying optical system which makes it possible to change, at normal viewing distance, from free, unhindered inspection of the object to be viewed to a magnified view of the same object by simple change in the direction of viewing, without requiring a manual operation of the system or requiring a change in head posture, whilst nevertheless the unhindered view with the unaided eye, on the one hand, and the view onto the object magnified by the said system, on the other hand, shows the same field of view.

It is a particular object of the invention to provide an optical system having the properties just described in the form of a stereoscopically magnifying system, in a working instrument of normal viewing distance.

It is a further object of the invention to provide a working instrument of the above type, wherein the optical system is combined with a mechanical carrier component which can be worn on the head of the user in such a way that the optical system may be used in the manner of spectacles and can, in the manner of binoculars, be adapted to the distance between the eyes of the particular user, whilst the mechanical carrier part is adjustable to the varying shapes and sizes of head of various users.

It is yet a further object of the invention to provide a working instrument of the above type which can be used even by a person wearing spectacles, whilst using the latter. Furthermore, it is an object of the invention that the optical system according to the invention should avoid a disturbingly broad, unfocused overlap zone between the unaidedly viewed image and the magnified image.

It is yet a further object of the invention to provide an optical system, having the properties just described, which is able to produce a real first (intermediate) image and in which the magnified image is visible to the user's eye through the ocular, in erected and left-to-right correct position.

The above objects and aims are achieved, according to the invention, by a magnifying optical system of the initially described type, wherein the optical system is located, given the said determined head posture, outside the beam path of direct viewing between the eye and the object field to be examined, the optical axis of the objective is directed towards the central point of the object field to be magnified, the optical axis of the eye lens of the ocular is directed towards the center of the eyeball, the two said optical axes form an obtuse angle with one another, and the optical axis of the objective and the central beam for direct viewing intersect at the central point of the object field examined, at a flat acute angle.

As a result of this arrangement, the object field can, for the same posture of the head, be viewed alternately enlarged by the system or unaided, bypassing the system. The object's field means the area or space, surrounding the central light beam and occupied by the object to be viewed, which is included in the field of view of the ocular when the central beam is emitted from a particular point of the object. As is known, the exit pupil is the image of the objective which the ocular projects, behind the system, at a place which in the ideal case should spatially coincide with the pupil of the eye.

For a given constant exit pupil, the greater the desired magnification, the greater the absolute diameter of the objective must be. If, however, the magnifying system is of low light transmitting power and hence has a small exit pupil, whilst the lighting of the workplace is good and hence the pupil of the eye of the person viewing the object's field is small, the abovementioned condition that the small exit pupil should precisely coincide, in all three spatial dimensions, with the pupil of the eye, which pupil is also small, can hardly ever be realized in practice. The minimal relative transverse shift of the pupils, which is unavoidable in practice, would, given a small exit pupil and a small pupil of the eye, immediately blank out the view through the system if certain tolerance conditions are not fulfilled. To fulfil these tolerance conditions, the optical system according to the invention can be so designed that the exit pupil is somewhat larger than the pupil of the eye, so that the latter always remains within the cone of lightrays from the exit pupil, even if the two optical axes are shifted laterally to one another.

Since the pupil of the eye of humans normally has a diameter of 2 to 3 mm given good working light, a minimum size of the exit pupil of 3 to 4 mm is therefore recommended in practice. It follows that for a given required magnification there exists necessarily a certain minimum diameter of the objective of the instrument.

If now the desired minimum angle of the field of view is assumed, together with a suitable viewing distance for working, which distance is, according to experience, about 30 cm, it is possible to calculate therefrom the angle of the optical axes of direct viewing, and of the instrument, which axes intersect in the center of the object's field. Preferably, this angle can be from 3° to about 20°. It is a preferred condition that the outer surface of the ray cone for direct viewing (the apex of which cone is located in the pupil of the eye) just touches the rims of the eye lens and of the objective. The eye lens of the eyepiece can be cut off, along a straight line, at the side which is touched by the mantle of the said cone. This has the advantage that on changing the direction of view, the angle through which the eyeball rotates can be kept small.

The deviating system can comprise a plurality of deflecting (deviating) components which erect the image and which deviate the central beam incident on the objective so that it is deflected upwards or downwards at an obtuse angle to the plane which passes through the central beam of the objective and is horizontal relative to the head of the observer, i.e. passes through both his eyes.

The ocular can comprise an eye lens which is cut off flat at its lower rim, to the extent that the change of viewing between direct viewing of the object and viewing through the ocular only requires a slight shifting of the eyeball, whilst the lower rim of the objective at most extends as far as the horizontal plane of the cut-off rim of the eyelens and does not project below this rim, so as not to interfere with the direct viewing of the object by the eye. The objective can be laterally shifted relative to the ocular and to the eye which views the ocular. Preferably, the lateral shift of the objective relative to the ocular is only of such magnitude that the difference in the angle at which the eye viewing the object sees the latter, on the one hand directly, and on the other hand magnified through the ocular, is virtually not noticed by the viewing person.

The deflecting elements which serve to erect the image can comprise four mirror elements, amongst which the mirror element which receives the central beam of the objective is angled so that the beam is deflected, from the plane running at right angles to the viewer and towards the latter through the center of the objective, outwards and upwards as viewed from the direction of the viewer. This deviated beam can then be projected by a second mirror element, at a right angle, transversely across the objective central beam, onto a third mirror element, from which it is projected vertically downwards, in a plane which runs through the eye lens of the ocular and is at right angles to the cut-off flat edge of the latter lens, first through the field lens of the ocular and then onto a fourth mirror element, which projects the beam at an obtuse angle in the last-mentioned plane through the eye lens (Porro system).

A stereoscopically magnifying optical double system can be so constructed that it comprises two systems exhibiting the arrangement described above, and being specularly identical to one another, the two oculars of the systems being located at a distance from the two eyes of the viewer, and that the two objectives are laterally displaced outwards, from the middle plane of the nose, relative to their corresponding oculars.

In the last-mentioned stereoscopically magnifying double system, the distance between the two objectives can be increased, relative to the distance between the two eyes of the viewer, by only such an amount that whilst the stereoscopic three-dimensional effect is increased, this increase does not exceed the critical angle, beyond which the two component images are no longer merged by the eyes of the viewer.

The difference between the two angles which are formed by the optical axes of the two eyes, on the one hand, and the optical axes of the two objectives, on the other, in both cases with the object as a common point of intersection, is, for a distance of the object from the eye of about 30 cm, preferably about 2° to 4°.

In the stereoscopically magnifying optical double system described above, an adjusting device can be provided on the ocular, by means of which the eye lens, which is cut off flat at its lower edge, can be shifted axially whilst the flat cut-off edge remains in the same horizontal plane.

Finally, in this double system the adjusting device can possess, in the circumferential rim surface of a mounting which surrounds the curved rim of the eye lens, a groove which extends helically relative to the central axis of the lens, and a setting ring with a plurality of inwardly directed projections which engage in the groove.

Preferably, the magnifying optical system according to the invention is accommodated in a housing, and the instrument component thus produced can then be mounted or held in various ways corresponding to the requirements of the particular use.

If moderate magnification is required, as is the case when the optical system is used by a watchmaker, it is advantageous to fix the instrument component to the head of the user, in the manner of spectacles, by means of a holding device (head mounting). In doing so, the following objects should preferably be achieved:

1. The head mounting and the instrument unit which it carries, which in the present case is preferably the double system described above, should be secure against shifting on the head of the user and should, in spite of its weight, not become objectionable during working even if worn for prolonged periods.

2. Since the shape and size of the head of different users always varies, the head mounting should provide appropriate means of adjustment, to enable it to be fitted to different heads.

3. The head mounting and instrument should be easy and quick to put on and take off, and once fitted to the shape of the head of a particular user, should reliably relocate correctly on the head when put on again after having been taken off.

4. If the optical system is a double system, the two parts thereof must be individually adjustable to suit the distance between the eyes of the particular user.

5. In the case of a double system, the distance of the eye lens from the eye must be adjustable so that the exit pupils coincide with the pupils of the eye.

6. The focusing of each part of the system must be separately adjustable to suit the particular eye, so that the object field appears in sharp focus precisely at the point of intersection of the stereoscopic viewing axes.

7. The instrument unit which carries an optical system, preferably constructed as a double system, in accordance with the invention should, during use, lie in front of the upper part (or the lower part) of the field of vision of the user and should, without manual operation, be movable upwards (or downwards) out of the field of vision in order to permit the user to obtain a direct view with the unaided eye, whenever desired.

These conditions are fulfilled by an optical working instrument comprising a head mounting and an instrument unit carried by the said mounting, in which the head mounting comprises, in a manner which is in itself known, a coronal or crest band which passes over the crown of the head, a frontal band (front headband) which passes over the forehead and an occipital or rear headband which passes over the back of the head, and wherein the instrument unit comprises an optical system which, in the operating position, is located somewhat below and somewhat forward from the middle region of the frontal band; all three bands are made of elastically flexible material and comprise adjusting means adapted for varying the lengths of the coronal band, the frontal band and the occipital band, and interconnecting the three bands with one another; and the instrument unit comprises a tilting device, by means of which the unit is tiltably hinged to the head mounting on both sides of the head, in the region where the frontal band connects with the occipital band.

The adjustment of the optical system of the instrument to suit the distance between the eyes of the particular person requires an adjustment of the two units of the optical double system along an arc of which the center point is in the object field, so that the distance of the point of intersection of the two optical axes from the eyes does not change.

The two component units of the optical double system are separately adjustable, on a guide rail, by adjustment devices, for example threaded spindles, to suit the particular distance of the eyes from the top of the nose. In general, the distance of the eye from the bridge of the nose is not the same on either side.

The housing containing the optical system, including the guide rail, can be joined to the tilting device by means of two arms resembling a spectacle bow. Because of the difference between the width of the head of different users, and because the band circumference of the head mounting must be increased when putting the device on and taking it off, the connection between the said spectacle bow-like arms and the guide rail must not be rigid. Even a simple hinge does not suffice, since this does not ensure that whenever the device is put on, the optical system will also return to its intended mean position, at least if the two hinges connecting the said arms to the guide rail are movable independently of one another. This can be avoided by crosswise strut-like connection of the arms, on either side of the hinges, to one another.

It is furthermore essential that the hinge which connects the arms to the tilting device of the head mounting should not merely be freely rotatable about a rigid axis, because each change in the circumference of the band also alters its angular position relative to the said arms. These hinges are therefore advantageously in the nature of a ball joint to the point that they remain movable, to a limited degree, in all directions.

The head mounting preferably has a feeler device, by means of which the head mounting can, after once having been fitted to a particular head and then having been taken off, be brought, when it is put on again, into precisely the same intended position, in respect of its height and its sideways direction.

In particular, the feeler device can comprise a feeler which extends downwardly from the middle region of the frontal band and has a lower bow-shaped end which serves lightly to touch the bridge of the nose when the head mounting is put on again.

In order to be able easily to put on, and take off, the optical instrument according to the invention, and at the same time always to ensure secure location on the head of the user, the instrument must be under spring tension which can, however, easily be released in order to take off the head mounting. The setting devices required for this purpose may comprise two pairs of handles fitted each on one side, in the temple region of the head mounting; if the two handles of one of the two pairs are pressed towards one another, the back end of the frontal band and the adjacent end of the occipital band which goes round the back of the head, which ends are pulled towards one another by means of a tension spring in the corresponding setting device which grips these two band ends, are pushed apart against the force of the said tension spring. This increases the circumference of the band of the head mounting and the latter can easily be taken off.

Since the two pairs of handles serve as grips both when putting on and when taking off the head mounting, it is advantageous if the two pairs lie in the central line of equilibrium of the optical instrument, so that, as far as possible, a tendency of the instrument to tip when it is put on or taken off is avoided. These setting devices function well if they are set to the minimum degree of adjustment required for release, that is to say for slackening the head mounting.

In order to fit the head mounting for the first time to the size of the head, the setting devices may additionally comprise fixing or arresting means, by which the coronal band, frontal band and occipital band can be fixed to have certain particular lengths.

In a preferred embodiment, it is not only possible easily to put on and take off the instrument as a whole, but it is also possible, without taking off the entire instrument, to provide, where required, a completely free field of vision for a certain time, that is to say to bring the optical unit completely outside the field of vision and conversely also to bring it back into the field of vision, and in particular to do so without requiring manual intervention, since this would interrupt the work of the user's hands.

Hence, in this preferred embodiment of the head mounting, the optical elements are tilted up and down by an upward and downward nodding movement of the head. For this purpose, a tilting device carrying the optical system on its end face is provided.

The tilting device should conform to the following requirements:

The tiltable system which comprises the optical system and the tilting device must, in its entirety, be in equilibrium relative to the head band system. This is necessary, firstly, because otherwise the intrinsic weight of the optical system would exert a constant forward and downward tension on the head band. Secondly, it is necessary because only in a labile state of equilibrium does the upward or downward adjustment of the tilting system, following the tilting movement caused by nodding the head, result in reasonably stable terminal positions.

The tilting device of the instrument unit can comprise stops for an upper and a lower terminal position of the instrument unit, in the region in front of, and below, the middle region of the forehead, and can comprise a counter-weight, by means of which the entire instrument unit is, in a middle position between the upper and lower terminal position, in labile equilibrium relative to the head mounting, as a result of which the person wearing the head mounting carrying the instrument unit, can bring the latter into the upper or lower terminal position of the tilting device by nodding the head up and down. In order to ensure adequate stability of the tilting device in the terminal positions, additional means of stabilization can be provided as a part of the stops. These may be spring stabilizers, especially toggle springs, which are tensioned in the middle position between the two terminal positions, whilst the tension is released in the terminal position, so that they always urge the instrument unit to adopt one of the two terminal positions.

Furthermore, it is also desirable that the weight being tilted, when striking the stops in the terminal positions, should not cause an unpleasant knock, which might cause the head mounting to shift. However, braking by spring means in order to absorb such knocks would cause the tilting device to spring back, and this would be disturbing at least when the instrument is being tilted into the use position.

Hence, the tilting device can advantageously comprise hydraulic damping means, by which the tilting movement from the labile equilibrium position toward the desired terminal position is increasingly damped. These damping means can comprise shock absorbers with braking pistons and cylinders, as well as passages for the braking fluid, in front of the piston, of a cross-sectional area which constantly diminishes as the braking piston moves into the braking cylinder. This is achieved by preferably having a braking piston and braking cylinder which are in the shape of a truncated cone, with the end face of the piston and the end wall of the cylinder, opposite the said end face of the piston, representing the two minor end faces of the truncated cone.

Each braking cylinder at the same time preferably has a central passage, into which a spring-loaded sealing mandrel, supported in the front end face of the piston projects via the end face of the piston into the said passage. This mandrel makes a seal, against the spring load, in a valve seat provided in the said passage, when the closed position is reached.

This ensures that, whilst the movement of the tilting device on reaching either of the two terminal positions is adequately braked to avoid any knock, the initiation of the reverse tilting movement, i.e. the movement of leaving the said terminal position, is effected merely by gently nodding the head, since the damping means exert virtually no braking action on the movement away from the terminal position, until the labile position of equilibrium has been passed.

Preferably, a shock absorber can be provided on either side of the head, one shock absorber being intended to brake the arrival of the instrument unit in the lower terminal position, i.e. preferably the use position, whilst the other brakes the arrival of the instrument unit into the upper terminal position, i.e. preferably the position where the instrument is out of use.

The tilting device can also comprise locking means, by which the instrument unit can be locked in the upper or lower terminal position.

The locking means may be manually operated securing levers, which secure the instrument part in one of the two terminal positions against being tilted by an unintentional movement of the head.

One of the advantages of a preferred embodiment of the present invention resides in the use of plane mirrors instead of prisms for deviating the path of the beam.

It is known that when using prisms the precise adjustment of two right-angled inverting prisms in the respective halves of the binocular system is difficult, since the following requirements have to be met:

1. The central beam entering through the objective must also issue through the center of the ocular;
2. The direction of the beam must remain the same, i.e. it must leave at right angles to the ocular lenses (if these two conditions are not met, the image quality is impaired);
3. The image inversion by the two prisms must be complete, i.e. precisely 180°, since otherwise the magnified image will not be seen accurately upright, which, particularly if the two halves of the system are of unequal inaccuracy, makes a complete merging of the two component images impossible.

According to the invention it is preferred to use four plane mirrors instead of the conventional right-angled prisms, for reasons of weight saving and cost saving, and, above all, because of the need to arrange at least two surfaces with a two-fold angle of inclination to the optical axis of the objective. Hence, a particular problem to be solved is to mount these mirrors in a simple and secure manner whilst substantially fulfilling the above requirements, and without requiring individual finishing.

In order to reduce the cost of the actual mirrors, precise plane parallelism is dispensed with, which presupposes that in order precisely to define the position only the mirror surfaces themselves are called into play, for which purpose they rest on a three-point support. In order to be able to keep the mirrors as thin as possible, for weight reasons, an outer or counter holder must engage, (e.g. clamp) the mirror at three points precisely opposite the support points, in order to exclude any bending stresses. Furthermore, the counter holder, e.g. clamping springs must be elastic in order to even out dimensional variations, and at the same time not to exceed the minimum required pressure on the mirror, because here again any irregularity could result in new dimensional inaccuracies. This applies, above all, if the housing has been injection moulded from a rigid plastic.

It necessarily follows, from these conditions, that the mirror surfaces in the main rest on two diagonally opposite corner points and must be correspondingly supported by the counter holders or spring-loaded clamps. The pressure of these clamps must be such that the mirror remains unmoved even under slight vibration and simultaneous pressure, due to its intrinsic weight, in the direction of the holding springs; on the other hand, this pressure must not be much greater, so as to avoid resulting long-term deformation. In order completely to stabilise the position of each mirror, a counter-support is also necessary at the third support point, but for this holder or clamp a very much lower pressure suffices because at this point there is no longer any weight to be carried.

The entire support is advantageously provided by a free-armed leaf spring which in turn is supported against the housing near the point of intersection of the longitudinal axes of the arms. The most advantageous support point on the spring side is near the center of the line joining the two principal support points, but moved sufficiently in the direction toward the third or auxiliary support point that the required minimum pressure is still exerted thereon.

The practical execution of this type of mounting thus requires a very accurate determination of the position, and uniform conformation to the twelve (four times three) mirror support points.

The achievement of uniform moldings of instrument casings containing the support points could probably be guaranteed when using electronically controlled molding machines; however, it is doubtful whether a moldmaker would be capable of conforming sufficiently accurately to the twelve spatially differently located support points and to their dimension inter-relation, since unforeseeable shrinkage and strain factors cause deviations therefrom.

Therefore, according to the invention, a mold construction has been developed which makes adherence to precise dimensions unnecessary since, in this mold construction, the critical points are adjustable in the actual mold, so that instead of the otherwise unavoidable expensive finishing work a simple readjustment is made, which has the further advantage that an excessive correction can easily be reversed again.

A further advantage of the mold construction according to the invention is that the mold consists of only two parts and is at the same time free from undercuts.

Spherical support elements are found to be suitable for adjusting the position of the three inclined mirrors, because these are produced by a helical axial displacement in the mold release direction and hence precisely determine the support height of the mirror surfaces which lie at an angle on the said support elements. On the other hand, in the case of the third mirror, which is in a parallel position, two cylindrical support projections are provided, which must be adjustable transversely to their axis. This transverse adjustment is achieved by that the cavity of the projection is formed by an eccentric hole at the end of a screw, whereby a rotation of this screw through at most 180° alters the height of the projection by twice the axial displacement, and furthermore an axial shift by not more than half a thread pitch has no disturbing effect. However, for reasons associated with the technique of mold construction, this procedure is only applicable in the case of the two inner support cylinders, located on the wall of the housing, whilst the third support point, located outwards, can be rigid and non-adjustable. This is no disadvantage since, even if only one of the twelve support points is adhered to with normal manufacturing accuracy, the remaining eleven can then be adjusted relative to this twelfth point.

In addition to being used for the purposes described at the outset, especially for watch repairs, the optical instrument according to the invention can also be used for work on other precision equipment and micronised electronic equipment, and generally wherever the replacement of small instrument components by other components requires viewing the working zone both with the bare eye and through a magnifying optical system.

BRIEF DESCRIPTION OF THE DRAWINGS

Further details of the invention are apparent from the description which now follows of a preferred embodiment of the invention, illustrated in the accompanying drawing, in which:

FIG. 10 is a part-view of the frontal region of the head mounting;

FIG. 11 is a plan view of the part of FIG. 6 shown in sideview in FIG. 8;

FIG. 12 shows, on an enlarged scale, a part of the left-hand clamping device shown in FIG. 8, with omission of the gripper knobs and of their support components;

FIG. 13 shows a longitudinal section through the same clamping device along a plane marked XIII—XIII in FIG. 12;

FIG. 14 shows, on an enlarged scale, the tiltable fixing, in an axial section along the plane marked XIV—XIV in FIGS. 12 and 13;

FIG. 15 shows a cross-section through the same clamping device, along the plane marked XV—XV in FIG. 13;

FIG. 16 shows a longitudinal section of the front region, facing the forehead, through the left-hand clamping device, along a plane marked XVI—XVI in FIG. 12;

FIG. 17 shows a longitudinal section through the back region, facing the back of the head, of the left-hand clamping device, along the same plane as in FIG. 16, and on a somewhat enlarged scale;

FIG. 18 shows a longitudinal section through the left-hand damping device along the plane marked XVIII—XVIII in FIG. 8, with the piston of the device in the fully introduced position, and the valve open;

FIG. 19 shows an axial section through a compression zone of the clamping device according to FIG. 18, but with the piston retracted and the valve open;

FIG. 20 shows, again in axial section, the piston of the damping device according to FIG. 19, but at the start of insertion, with the valve already closed;

FIG. 21 shows a damping device according to FIG. 18 in cross-section along the plane marked XXI—XXI;

FIG. 22 shows a damping device according to FIG. 18 in cross-section along the plane XXII—XXII;

FIG. 23 shows a carrier device for the optics, appertaining to the tilting part, in plan view;

FIG. 24, shows in plan view, the device provided on the carrier for adjustment to suit the distance of the eyes of the particular individual, FIG. 25 shows the same device as in FIG. 23, but in front view onto the end face of the embodiment according to FIGS. 6 and 7;

FIG. 26 shows a cross-section through the same adjustment device, along the plane marked XXVI—XXVI in FIGS. 24 and 25;

FIG. 27 shows a cross-section through the adjustment device along a plane marked XXVII—XXVII in FIG. 26;

FIG. 29 shows a section through the upper part of the housing along a plane marked XXIX—XXIX in FIG. 28, looking onto the third mirror;

FIG. 30 shows a view of the third mirror in the direction indicated by the arrow 31 in FIG. 29;

FIG. 31 shows a plan view onto the back of the mirror shown in FIG. 28 and

FIG. 32 shows a partially cut-open view of the eyepiece part, viewed from the right in FIG. 28.

DETAILED DESCRIPTION OF THE EMBODIMENT SHOWN IN THE DRAWINGS

Figure 1:
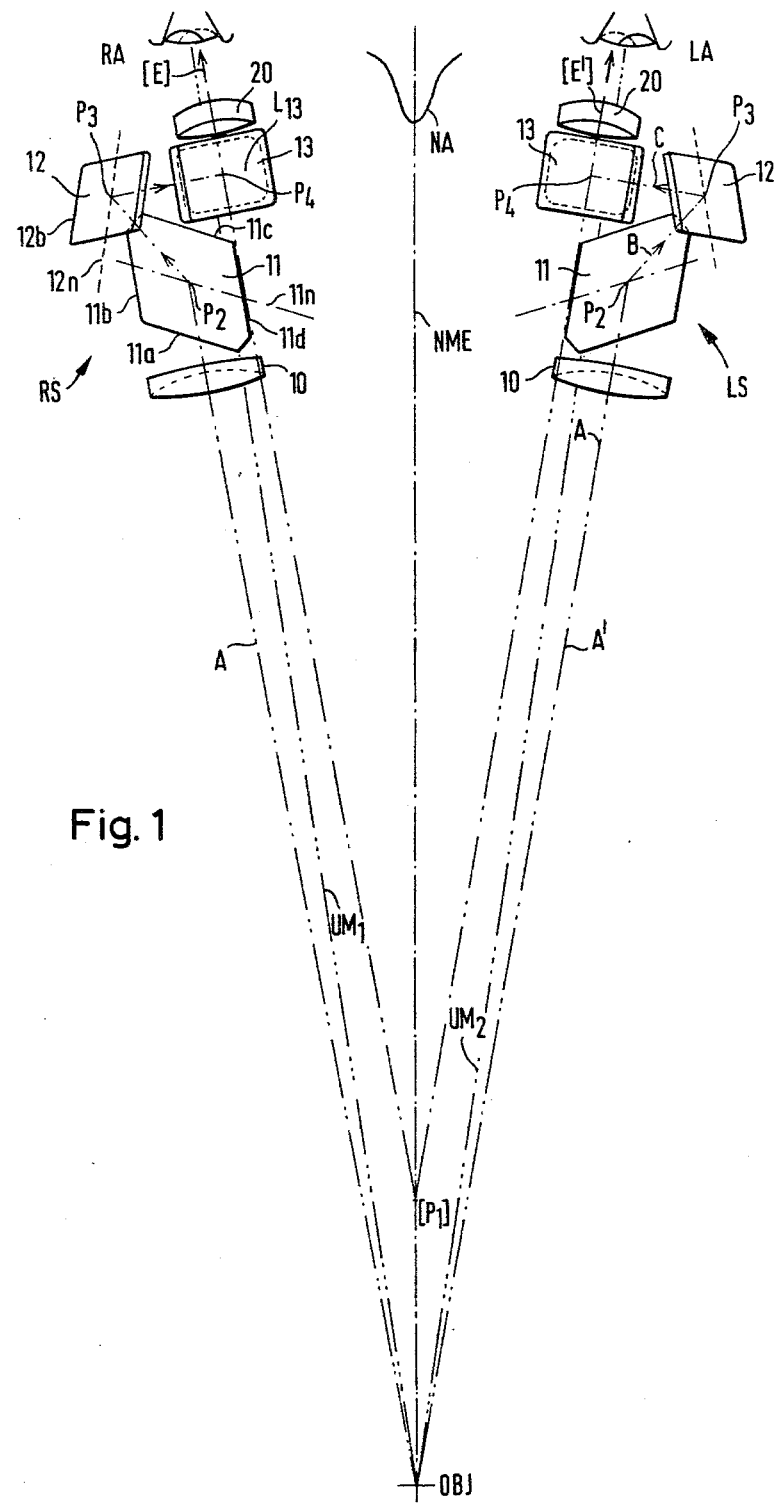
FIG. 1 shows schematically a preferred embodiment of the stereoscopically magnifying optical double system according to the invention and the path of a light beam, from an object to be viewed to the eyes of the user of the system.

In FIG. 1, the right-hand eye RA and the left-hand eye LA are each shown at a distance of 33 mm from the middle plane of the nose, marked MNE and passing through the tip NA of the nose, with the object to be viewed, OBJ, being located at a distance of about 300 mm from each eye. The middle beam $UM_1$ passes from the object directly to the unaided right eye RA and the middle beam $UM_2$ correspondingly passes directly from the object to the unaided left eye LA.

Figure 1A:
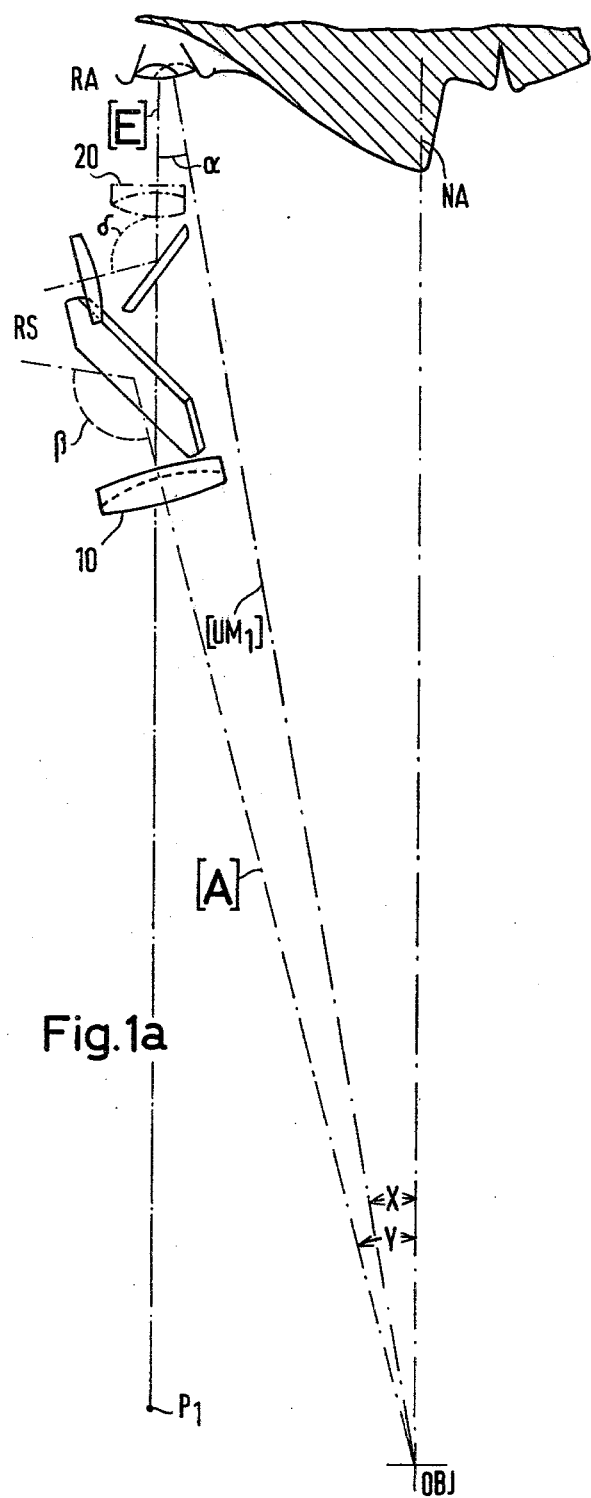
FIG. 1a shows a sideview of the same beam path for the right eye, taken in the middle plane of the nose.

The two eyes LA and RA can look at the same time through a stereoscopically magnifying double system which consists of two optical individual systems RS and LS which are inherently identical but are the mirror image of one another. The central beam A leaving the object, the projection of which beam on the plane of the paper is marked [A] in FIG. 1a leads into the right-hand optical system RS and is deviated by the latter so that it enters the right eye along an exit axis E, which is parallel to the entry axis A and the projection of which on the plane of the paper in FIG. 1a is marked [E].

The beam A' emanating from the object enters the left-hand optical system LS and there undergoes a deviation being the mirror image of the deviation of beam A, so that it enters the left eye LA along the exit axis E' (in FIG. 1, its projection [E']). The exit beams E and E' extrapolated backwards from the eyes via the two individual systems RS and LS, meet in the middle plane of the nose, NME, at a point $P_1$ where is nearer to the eyes than is the object (in FIG. 1, its projection $[P_1]$ is shown). A correction of this "error" would readily be possible by appropriate readjustment of the optical elements in the two individual systems RS and LS, but would run counter to the customary reflex movements of the two eyes on stereoscopic viewing, where the eyes, on adjustment to an object which appears nearer and therefore larger, move their axes of vision towards one another.

In the text which follows, the individual optical system RS, which aids the right eye RA, will be described. What will be said about this individual system applies equally, but with mirror-image left-to-right inversion, to the left-hand individual system.

Figure 2:
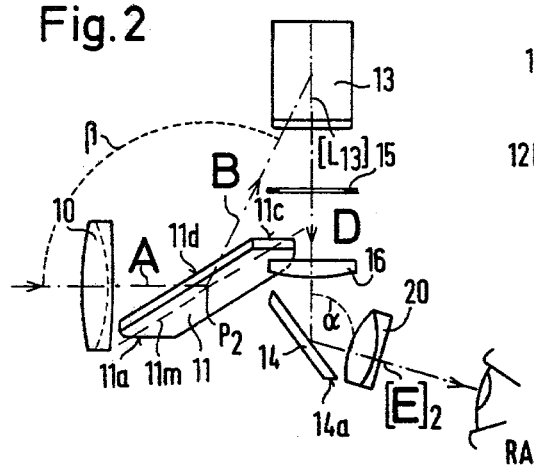
FIG. 2 schematically shows, in a plane at right angles to the plane of FIG. 1, the beam path between the object and an eye viewing the object, with the interposition of the preferred embodiment of the magnifying optical system according to the invention.

FIG. 2 shows the paths of the above mentioned central beams from the object to the right eye RA outside the individual system RS in a plane which passes through the direct middle beam $UM_1$ and the middle beam A which leads to the objective 10 of the individual system RS.

The exit beam E which leaves the eye lens of the ocular and enters the right eye RA forms, with the direct beam seen unaided, an angle $\alpha$ of about 14°. FIG. 2 shows the projection [E] of this exit beam E on the said plane as well. The deviations of the path of the beam in the individual optical system RS are only shown as projections on the last-mentioned plane.

FIGS. 2, 3, 4 and 5 show the individual optical system RS.

Figure 4:
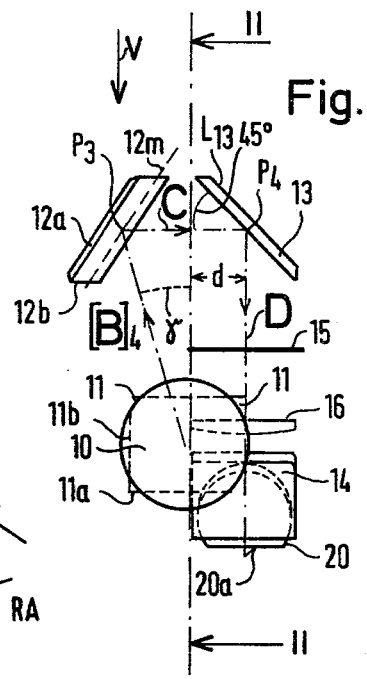
FIG. 4 shows schematically the same embodiment as in FIG. 3, but with the direction of viewing being ads indicated by IV in FIG. 3 and, FIG. 5 shows the same embodiment, but with the direction of viewing being as indicated by V in FIGS. 3 and 4.
Figure 3:
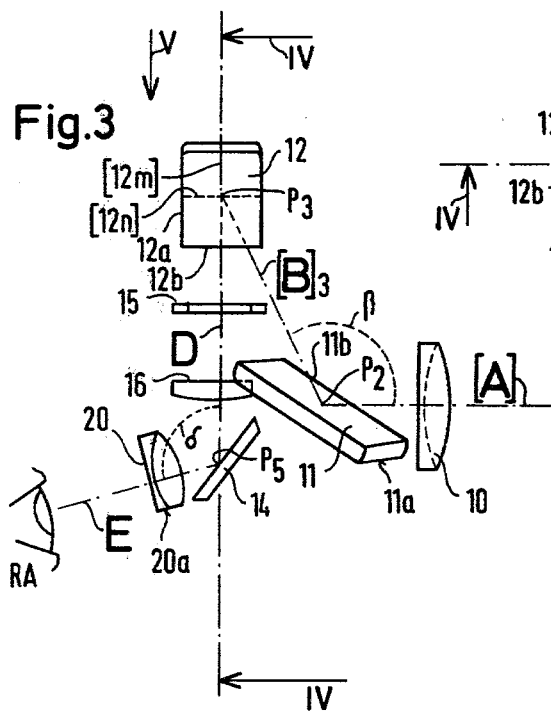
FIG. 3 shows schematically the optical system in the embodiment shown in FIG. 2, but viewed from the opposite side, in the plane through beam E and parallel to the plane of FIG. 2.

As is apparent from FIGS. 2, 3 and 4, the middle beam A, which runs in the plane of FIG. 2 has its projection [A] in the plane of the paper in FIG. 3, and runs parallel to this plane, whilst it vertically enters the plane of the paper in FIG. 4 and passes into the objective 10 which is constructed as an achromatic combination in the conventional manner, whereupon, from the objective 10 it reaches the plane mirror 11, of which the back is shown in FIG. 3 and the reflecting face in FIG. 4. This mirror 11 in fact has a parallogram-shaped mirror surface but looks rectangular in FIG. 3 because of the inclination of the mirror, of which the lower edge 11a is inclined to the objective 10 whilst the left-hand edge 11b of the mirror surface projects out of the plane of the paper in FIG. 3 or is behind the plane of the paper in FIG. 4.

At the plane 11, the beam A is deflected, at the point $P_2$ where it strikes the mirror, and assumes the direction of the beam B (the projection $B_2$ of which is seen in FIG. 2), so that the projection $[B]_3$ of the beam B on the plane of the paper of FIG. 3 forms an angle $\beta$ of about 108°, whilst the projection, marked $[B]_4$, of the beam B onto the plane of FIG. 4 forms an angle $\gamma$ of about 20° with the plane of the paper of FIG. 2, which is marked II—II in FIG. 4. Consequently, the beam B issues from the plane of the paper of FIG. 3, with regard to the beam path from the object being depicted to the right eye RA, in an outwards direction, i.e. from the eye outwards to the right. There, the beam B encounters, at point $P_3$, the plane mirror 12 which is shown from the back in FIG. 3 and from the front, i.e. with its obliquely positioned mirror surface visible, in FIG. 4. This mirror 12 is set so that the projection of its longitudinal axis 12m onto the plane of the paper of FIG. 3, the projection being marked [12m], runs in a plane IV—IV, which is at right angles to the central beam A and is identical with the plane of the paper in FIG. 4. At the same time, its transverse axis $12n$, shown by its projection [$12n$] in FIG. 3, is inclined somewhat relative to the plane of the paper in FIG. 3, so that its left-hand mirror surface edge $12a$ projects somewhat from the plane of the paper in FIGS. 3 and 4, namely at such an angle that the beam B, deviated by the mirror 12 at point $P_3$, continues in the direction of the beam C, which runs horizontally in the plane of the paper in FIG. 4, i.e. perpendicularly to the plane of the paper in FIG. 3. Beyond the last-mentioned plane of the paper, marked III—III in FIG. 4, the beam C encounters, at point $P_4$, a plane mirror 13, the longitudinal axis $L_{13}$ of which runs in the plane of the paper in FIG. 4, and which is at right angles to the said plane of the paper and is inclined so that the beam C strikes it at an angle of 45° and is thereby deflected downwards at a right angle. The beam D deviated by this mirror 13 passes, in the plane of the paper of FIG. 4, through an image window 15 and the field lens 16 of the ocular until it reaches a fourth deviating mirror, the plane mirror 14, which is at right angles to the plane of the paper of FIG. 3 and is so inclined to the beam D that the latter is deflected, at point $P_5$, downwards at an angle $\delta$ of 105°, away from the objective. The beam E deviated by the mirror 14 now passes through the eye lens 20 of the ocular into the viewing right eye RA.

Figure 5:
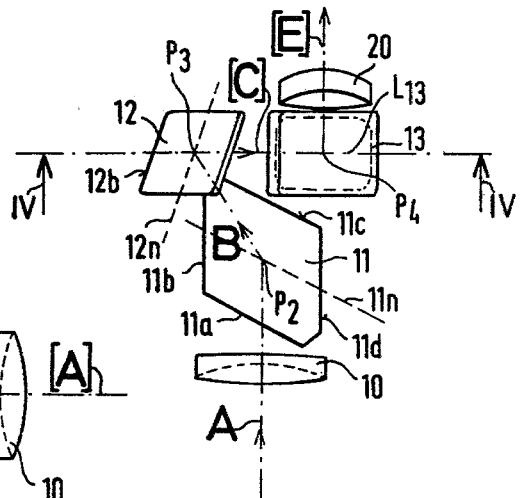

The plane of the paper of FIG. 5 should run along the lower cut-off edge $20a$ of the eye lens 20, specifically in such a way that the beam D runs down from $P_4$ perpendicular to that plane and the beam A and the beam C run parallel thereto, in different planes, with the beam C running straight from point $P_3$ to point $P_4$.

The preferred inclination of the mirrors 11 and 12 relative to the optical axis A of the objective 10, on the one hand, and the optical axis D through the center of mirror 13 relative to the mirror 14, on the other hand, may be determined in a separate manner, as follows.

In the case of mirror 11, a differentiation is made between the middle axis $11m$ which passes through the point of impingement $P_2$, in the plane determined by the beams A and B (FIG. 2), in the mirror surface, and the middle axis $11n$ which passes through the point $P_2$, parallel to the front edge $11a$ of the mirror (FIGS. 1 and 5). The tangent of the acute angle enclosed between the optical axis A and the mirror middle axis $11m$ should be $\frac{2}{3}$ (FIG. 2), whilst the tangent of the acute angle enclosed between the mirror middle axis $11n$ and the line which runs through point $P_2$, parallel to the optical axis C (FIG. 5) should preferably be $\frac{1}{2}$.

In the case of mirror 12 it is again necessary to differentiate between a mirror axis $12m$, which runs through the point $P_3$ parallel to the mirror edge $12a$ in the mirror surface (FIG. 4) and a mirror middle axis $12n$ which runs through the point $P_3$ parallel to the mirror edge $12b$ (FIG. 3).

The inclination of the mirror 12 relative to the optical axes A and C is preferably determined, on the one hand, by the tangent of the acute angle formed between the mirror axis $12m$ and the line running through point $P_3$ parallel to the optical axis D (FIG. 4), which tangent should be $\frac{2}{3}$, and, on the other hand, by the tangent of the acute angle formed between the mirror middle axis $12n$ and the line running through point $P_3$ parallel to the optical axis A (FIG. 5), which tangent should be $\frac{1}{2}$.

If these inclinations of the mirrors 11 and 12 are adhered to, the instrument gives optimum image reproduction.

An optical instrument for normal viewing distance, equipped with this simple magnifying optical system or with a stereoscopically magnifying double system according to the invention accordingly offers the user the possibility, without any manipulations and without changing the posture of the head, but simply by changing the direction in which he looks, to see, as desired, the same object field unaided and unhindered or under the magnification provided by the optical system, the viewer being able to make the change without losing sight of the image field.

As described in more detail below, the working instrument can be attached to a head mounting so that it can be used as spectacles or in a spectacle-like manner, when placed in front of (ordinary) spectacles.

To this effect, the working instrument comprises, as the optical system, a stereoscopically magnifying double system of two parts, the distance between which can be varied so that the instrument can be matched to the distance between the eyes of the user.

The essentially transitionless change from the directly viewed image to the image seen under magnification is made possible by the sharp separation edge already described and present on each of the eye lenses of the two oculars. This separation edge is above the field of direct vision in the case of the embodiment described above, which is why, in the embodiment described, the part of each eye lens located somewhat below the middle of each lens is cut off along a straight line.

Further, it has been ensured that when using the instrument as spectacles, the image-dividing cut edges of the lenses are not too close to the eyes. This also ensures that the angular change in the direction in which the eye looks does not become excessive. Furthermore, the formation of an objectionably wide, blurred overlap zone between the directly viewed image and the magnified image is avoided.

An upper limit to the distance in front of the eyes is furthermore imposed by the fact that given a sufficient angle of sight, the oculars would become too large. Depending on the required magnification, there are corresponding constructional limits imposed by optical considerations. In the optical system according to the invention, resulting from a sufficient angle of sight, a real first image is preferably formed, and this is achieved by a two-component ocular consisting of the above mentioned field lens and the eye lens which is cut off at the bottom, along a straight line. The four inverting mirrors, which ensure that the image seen by the eye through the ocular is left-to-right correct and erected, are, according to the invention, built into the optical system so as to conform to the following conditions:

1. The objectives lie, at least in the plane which is approximately at right angles, or, deviating therefrom, at a slight angle, to the horizontal plane which passes through both eyes and through the object to be viewed, approximately on the axis of the ocular extrapolated away from the eye, as a result of which the stereoscopic double sight angle is not increased substantially (FIG. 1a);

2. the axes of the objectives are inclined downwardly, relative to the axes of the oculars, to an extent that they intersect the axes of direct viewing in the transverse plane of the object, i.e. in the plane to which the axis of symmetry extending in the horizontal plane between the two eyes of the viewer is perpendicular, and which contains the object; and 3. no component of the optical system is present in the beam path from the object to the eye when the former is viewed directly.

To conform to these three conditions, the path of the light beams in the optical system runs, in the manner described above, preferably from the objective via three of the four deviating mirrors, described above, to the field of the ocular, and from the latter via the fourth mirror into the eye lens of the ocular.

This beam path in the system according to the invention differs from the conventional in that the entry and exit axes of the beam path, i.e. the axis of entry into the objective and the axis of exit from the eye lens of the ocular, do not run parallel to one another but must also not be excessively displaced relative to one another, for which purpose the conventional right-angled mirror reflection angles do not always suffice.

Since however it is not possible to depart to an optional degree from these mirror reflection angles without interfering with the precise erection of the image, certain interrelated angular conditions must be observed; these can be calculated, or determined empirically. The preferred conditions are mentioned above.

It is possible to deviate from the embodiment described above as long as the conditions of complete image inversion are adhered to. This is the case if any departure of one of the three middle beam paths B, C and D from its right-angled position relative to one of the other beam paths is compensated by an appropriate angling in a plane at right angles to the first-mentioned beam path.

Only by this means is it possible to conform to the condition already stated, that the axis of the objective and the axis of the ocular should run close to one another. Thus, if the beam path A entering through the objective into the system according to the embodiment shown in the drawing runs in the plane of the drawing of FIG. 2, the beam path B extending from the first to the second mirror of the deviating system must be deviated at an angle out of the plane of FIG. 2 and upwardly at an angle. The beam path C extending from the second to the third mirror and the beam path D deflected downwards, at a right angle, by the third mirror, on the other hand both run in the transverse plane which extends through the path C at right angles to the plane of FIG. 2. The beam path D which passes through the field lens of the ocular and strikes the fourth mirror of the deviating system is now not deviated at a right angle, as taught in German Patent Nos. 1,239,869 and 1,497,664, but at a somewhat larger angle into the eye lens of the ocular.

In addition to the above mentioned optical conditions, the example of how the beam is guided, illustrated in relation to the above embodiment of the system according to the invention also conforms to a constructional requirement, namely, that the axial lines of the beams are at all points sufficiently far apart from one another to leave sufficient space for the mirror surfaces and the total of beam paths corresponding thereto.

Given the restricted space conditions which apply especially in the case of an optical instrument to be worn like spectacles, and, above all, also given the cut eye lenses, an elongated rectangular image field, with rounded corners, is particularly advantageous. Since, for such use of the instrument, the bulk and weight should be as small as possible to make the instrument as manageable as possible, surface mirrors are preferably used as deviating elements in lieu of the conventional prisms.

It is true that, in the case of the last-mentioned use, focussing is primarily effected by deliberately chosing the right distance of the eye of the user from the object. However, an adjusting device is preferably provided on at least one of the two oculars in order to be able to balance out inequalities of the two eyes of the user. However, for this purpose, the eye lens of the particular ocular must be moved only axially, because the presence of the straight-line transverse cut at its underside forbids rotation of the eye lens for fine adjustment.

Figure 6:
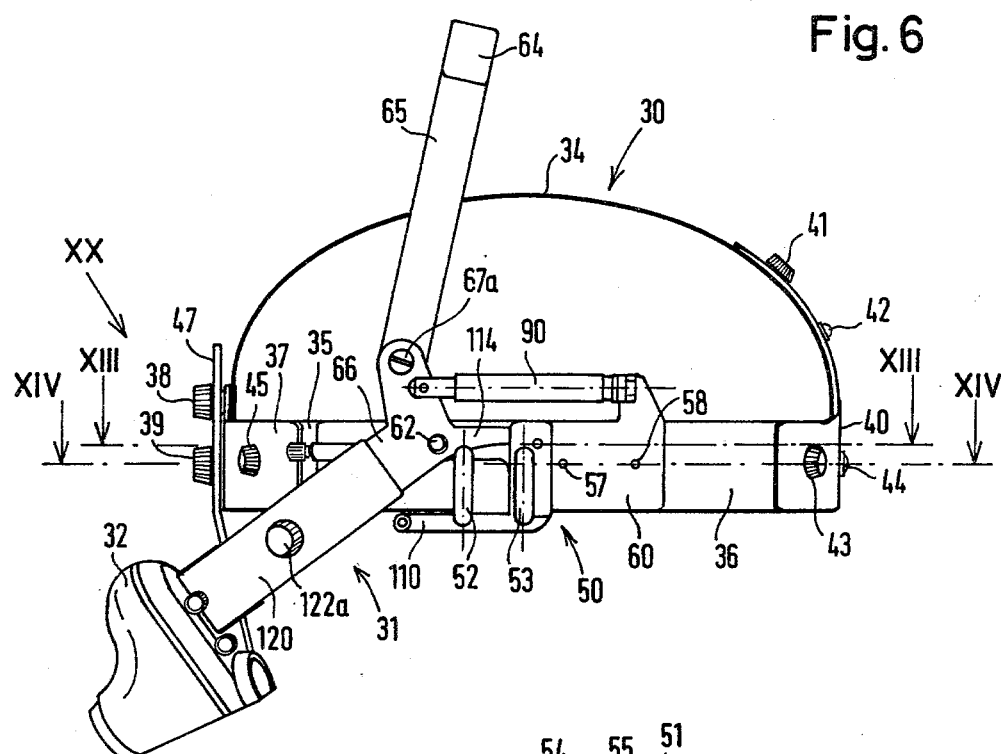
FIG. 6 shows, viewed from the left-hand side, a preferred embodiment of the view-changing instrument suitable for moderate magnification, as required, for example, by a watchmaker, and suitable for fixing to the head of the user.
Figure 7:
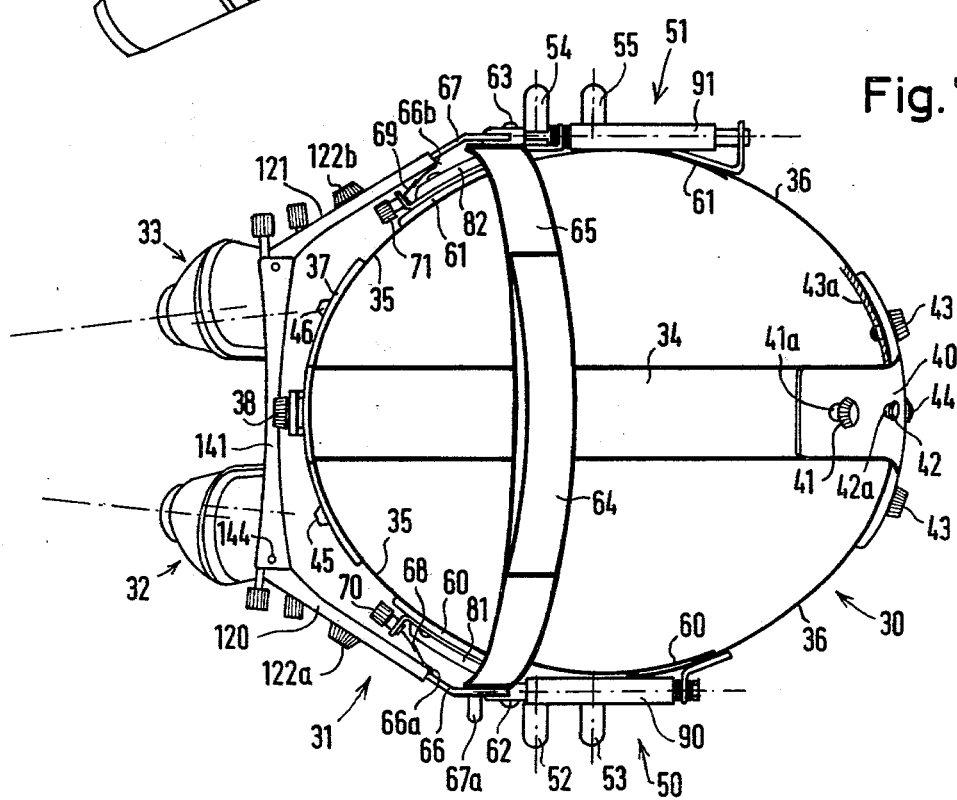
FIG. 7 shows a plan view of the embodiment shown in FIG. 6.

FIGS. 6 and 7 show the preferred embodiment of the alternate viewing instrument according to the invention, comprising a head portion 30, a tiltable instrument portion 31 and two housings 132 and 133 of instrument units 32 and 33 containing the optical double system.

Figures 8, 9:
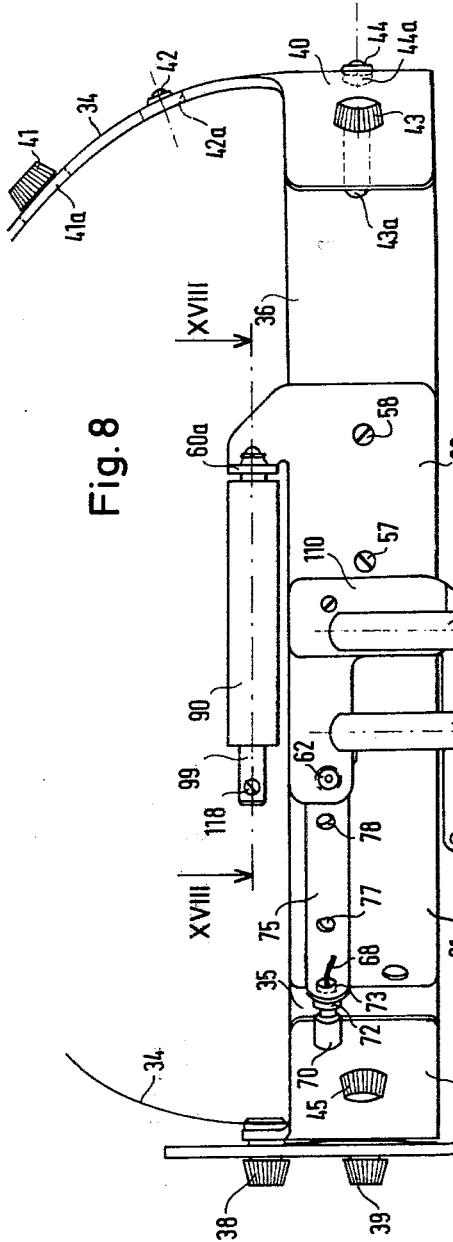
FIG. 8 shows a sideview of the same embodiment in actual size, but after removing the instrument part and the tilting device for the same.
FIG. 9 shows a part of the tilting device, viewed from the right-hand side.

In detail, the head portion 30 comprises, as shown in FIGS. 6 to 8, three elastic band elements, namely the crest or coronal band 34, the frontal band 35 and the occipital band 36, which three bands are all adjustably connected to one another and can thus be matched to various head sizes.

The connection between the coronal band 34 and the frontal band 35 comprises, as is apparent from FIGS. 6 to 8, a frontal plate 37 to which the frontal band 35 is firmly fixed by means of the screw connections 38 and 39. The coronal band 34 and the occipital band 36 are adjustably fixed to a plate 40 at the back of the head, by means of screw connections 41 and 42, and 43 and 44, respectively. Of the screw connections 41 and 42, one is in the form of a clamping screw 41 and the other a guide screw 42, both of which fit into slots, 41a and 42a respectively, of the coronal band 34. In this way, the length of the coronal band can be matched to the size of head.

Each of the two screw connections 43, which fit into slots 43a of the occipital band 36, serves as a clamping screw, whilst the screw connection 44 protrudes through a slit 44a in the occipital band and serves as a guide screw where the occipital band 36 is connected to the plate 40 for the back of the head.

At the frontal plate 37, the frontal band 35 can be fitted analogously to the circumference of the head by adjustment by means of the screw connections 45 and 46.

The frontal band 35 and the occipital band 36 overlap in the temple region and are connected to one another on the left-hand and right-hand side of the head, in the temple region, by means of clamping devices 50 and 51. These clamping devices 50 and 51 are required in order to be able to put on and take off the instrument easily at any time, which is only possible if the horizontal band system comprising the frontal band 35 and the occipital band 36 can be slackened sufficiently relative to the circumference of the head.

This is achieved if the two pairs of gripper knobs 52, 53 and 54,55 are urged against one another by means of the thumb and index finger of each hand. When the instrument has been placed on the head, the two pairs of grips are released, as a result of which the occipital band and frontal band move towards one another, under the action of a spring 56 provided for each pair of knobs, on either side, so that the entire system encircles the head under sufficient pressure to prevent the system from shifting (FIGS. 13 to 15).

For this purpose the frontal band 35 possesses, on the left-hand side of the head and near the end which points to the back of the head, two screw connections 57 and 58 which project outwards through the side plate 60, and by means of which the side plate 60 is held fast on annular shoulders 86a and 87a of the spacer bushes 86 and 87, whilst on the right-hand side of the head the side plate 61 is held analogously, by means of screw connections 59a and 59b, against spacer bushes 87 and 88 (FIGS. 8, 9 and 17).

The occipital band 36, which is provided with slots 86a and 87a, through which the spacer bushes 86 and 87 project outwards, extends between the frontal band 35 and the side plate 50 (FIG. 17).

In FIGS. 13 to 16 the occipital band 36 is tensioned, overlapping the frontal band 35, in the direction of the frontal plate 37. The tensioning device comprises the tension spring 56 and the two spring mountings 124 and 125, of which the outwardly projecting spring mounting 124 (FIG. 16) is fixedly inserted in the occipital band 36, whilst the spring mounting 125 is firmly fixed to the frontal band 35 and protrudes outwards through a slot 126 in the occipital band, near the front end of the said band, which points towards the frontal plate 37.

The tension spring 56 pulls the spring mounting 124, fixed to the occipital band 36, towards the spring mounting 125, fixed to the frontal band 35, and thus tends to increase the overlap between the two bands 35 and 36, until the back end 126a of the slit 126 encounters the spring mounting 125 and imposes a stop on the overlap. The spring force which increases the overlap of the bands 35 and 36 however tends to reduce the distance between the frontal plate 37 and the back plate 40, i.e., it tends to seat the head mounting more firmly on the head of the user.

In this clamped position the rear ends of the slots 86a and 87a rest against the spacer bushes 86 and 87.

At its frontal end region, the side plate 60 carries the gripper knob 53, whilst the occipital band 36 carries, at its frontal end, a clamping plate 81, fixed to it by means of the screw connection 127, at the rear end of which plate is fixed the gripper knob 52 which, in the non-actuated position, is at about a thumb-width's distance from the gripper knob 53.

Preferably, a pair of gripper knobs 54, 55 and a clamping plate 82 are also provided on the right-hand side of the head. In order to slacken the head mounting on the head of the user and thereby be able to take it off easily, the gripper knobs 52 and 53 located on the left-hand side of the head are pressed towards one another by means of the thumb and index finger of the left hand. The same is done with the gripper knobs 54 and 55 on the right-hand side of the head (FIGS. 7 and 9).

This causes the clamping plate 81 in FIG. 16 to move to the right. In doing so, it carries the spring mounting 124 with it, whilst tensioning the spring 56, and can do so until the spring mounting 125 comes to a stop against the front end 126b of the slit 126, whilst the spacer bushes 86 and 87 in the slits 86b and 87b are pushed towards the frontal side. This reduces the overlap between the bands 35 and 36, i.e. the distance between the frontal plate 37 and the back plate 40 is increased, as a result of which the user can easily take off the head mounting (FIGS. 16 and 17).

In order to be able to obtain a perfect view through the optical system, it is however preferable additionally to ensure that, whenever it is refitted, the entire apparatus is reliably, rapidly and securely clamped in precisely the intended position both in respect of height and in avoidance of possible errors due to a sideways shift.

This is achieved by means of a nose feeler 47 the lower, bow-shaped end 47a of which lightly touches the bridge of the nose. This ensures a laterally symmetrical position, but does not ensure the individual correct height position; the latter error is dealt with by a once-for-all adjustment of the nose feeler 47 on the frontal plate 37, the height of the feeler being adjustable by sliding the two slots 38a and 39a relative to the clamping screws 38 and 39 (FIG. 10).

The labile equilibrium required to allow the instrument unit (tilting unit) 31 to be tilted by nodding the head is brought about by a counter-weight 64, for example a lead weight, which is connected by an adjustable strap 65 to the tilting lever 66 which carries the optical system, the desired angling being adjustable by means of the fixing screw 67a and/or 67b (FIGS. 6, 7 and 9).

On the side plate 60, 61, provided on either side of the head, and joined by means of screw connections 57 and 58 (or 59a, 59b) to the occipital band 36, there is a pivot bearing for each of the tilting levers 66 and 67.

With the instrument unit in the lower terminal position, that is to say the working position, the left-hand lever 66 rests, by its extension 114 running from the region of the pivot bearing 62 towards the head plate 40, in the position shown by solid lines in FIG. 12, against the upper catch 106 of a fixing lever 110 which is mounted so as to tilt about the pivot bearing 111 on the corresponding side plate 60 (FIGS. 12 and 13).

In this position, the fixing lever 110 is tilted with its pivot arm 110a against the side plate 60, until that end of the slot 107 in the fixing lever 110 which points towards the pivot bearing 62 rests against the peg 108 which is fixed to the side plate 60 and projects outwards. On tilting the instrument unit, the extension 114 can now execute a downward movement as a result of simply nodding the head, this being accompanied by an upward movement of the pivot rail 120 which carries the optics, until (as shown in broken lines in FIG. 12) the extension 114 abuts against the lower catch 109 of the fixing lever 110 and accordingly the instrument unit has attained its upper terminal position.

In order, where especially required, to be able additionally to secure both terminal positions of the tiltable system against unintentional movements of the head, the fixing lever 110 must be moved about its pivot bearing 111 so that the tilting arm 110a moves downwards. As a result, the two notches 112 and 113 provided at the upper end of the fixing lever are moved towards the pivot bearing 62, the extension 114 of the left-hand tilting lever 110 being inserted into one of these notches in the upper or lower terminal position. A small toggle leaf spring 115 serves automatically to secure the position of engagement of the fixing lever 110. Fixing lever 116 on the right-hand side bears tilting arm 116a and engages extension 117 of tilting lever 67 in a similar manner.

The individual distance of the optical system from the eye can additionally be set by adjusting the tilting rails 120 or 121 on the tilting levers 66 or 67, and be secured thereon by means of the fixing screws 122a and 122b, respectively.

It is also advantageous further to improve the stability of the two above mentioned terminal positions by means of spring stabilizers 68 and 69 (FIGS. 8, 9 and 13). The stabilizers consist of toggle springs, of which one end, 68a and 69a respectively, is attached in a movable manner to the tilting lever 66 by means of a hollow plug 66a or 66b, respectively, whilst the other end 68b or 69b, respectively, is held in an adjustment screw 70 or 71, which is adjustably screwed into a sleeve 72 having an internal thread, the sleeve being firmly seated on an angle portion 73 of a stabilizer carrier plate 75 (or 76). The stabilizer carrier plate 75 is fixedly screwed to the frontal band 35 by means of screws 77 and 78 located in spacer bushes 79 and 80 (FIG. 13). The bushes 79 and 80 at the same time serve as guide elements for the clamping plate 81, and project through slots 84 and 85 in the latter. The clamping plate 81 is firmly fixed by means of screw connections 127 and 128 to the frontal end region of the occipital band 36 (FIGS. 11 to 16).

FIG. 14 shows, on an enlarged scale, the pivot bearing 62 by means of which the tilting lever 66 is fixed to the side plate 60. The hollow peg 130 is fixedly set into the side plate 60 and its head portion 131 projects outwards, the side wall of the projecting portion being a spherical zone. The pivot-bearing cup 132, fixedly set in a hole 66c of the tilting lever 66, sits on the said convex spherical side wall and is held on the pivot peg, allowing some play and permitting the tilting motion, by means of a holding screw 133 screwed into the hollow peg 130.

Since the upward and downward tilt of the instrument part would per se be associated with a substantial knock when the terminal stop is reached, and since such knocks would not only present the danger of shifting the head band system but could in the long term become very objectionable, the two stopping actions in the terminal positions are each softened by a hydraulic shock absorber 90, 91, interposed on the right-hand and left-hand side of the head between the tilting system and the head mounting (FIGS. 18 to 22).

The shock absorber 90 has an external cylindrical sleeve 90a which carries, within its closed end, the actual cylinder 94; the piston 92, which is located at the inner end of cylinder 94, is movably supported on a tapered mandrel portion 95 of a piston rod 99 and projects into the stroke cavity 98 of the cylinder 94.

On its collar portion 104, which projects backwards beyond the piston 92 and surrounds the piston rod 99 whilst leaving an annular passage channel 97 thereabout, the cylinder 94 carries an elastic hose 105, which surrounds the piston rod 99 and is fixed, by its back end, to a thickened portion 135 located further to the rear away from piston 92. On its thickened portion 135, the piston rod 99 additionally carries a ring flange 136 which serves to guide the rod in the cylinder sleeve 90a.

A braking fluid is present in the space 96 between the hose 105 and the piston rod 99 as well as in the passage channel 97, in the stroke chamber 98 and in a return conduit, described later.

At its front, stepped-down peg portion 137, which projects forward, i.e. ahead of piston 92, from the cylinder sleeve 90a, the cylinder 94 of the shock absorber 90 is supported, via a rubber cushion 138, in the angle flange 60a of the side plate 60 and is secured therein by means of the holding nut 139. The left-hand side shock absorber 90, connected to the tilting lever 66 via the link joint is intended for damping the upward movement of the tilting device whilst the right-hand shock absorber 91 (FIG. 9) is intended for damping the downward movement. At the same time it is necessary to conform to the condition that at the start of the tilting movement by merely nodding the head, no noticeable braking action should yet result, so as to hinder the initial movement as little as possible, whilst the braking action should increase substantially towards the end of the movement. For this purpose, the piston 92 and the braking cylinder 94 into which the piston enters are constructed as, respectively, a truncated cone piston and cylinder tapering in the direction of introduction (of the piston into the cylinder), so that at the start of the braking action, in the outermost withdrawn position of the piston (FIG. 19), the braking fluid 96 flows through a relatively large passage channel 97 which, however, automatically narrows as the piston is introduced further, so that the braking action progressively increases. This by itself would however have the consequence that on retracting the piston 92 from the cylinder 94, a constant suction resistance would also arise in the shock absorber, and this would correspondingly make it more difficult to initiate the reverse movement, from the lower to the upper position, by merely nodding the head (FIGS. 18 to 22).

To prevent this situation, the piston 92, together with the mandrel portion 95 of the piston rod 99 and a pressure spring 100 placed around the mandrel portion 95 forms an automatic valve system. When the piston rod 99 has reached its terminal inserted position (FIG. 18), the piston 92 is pushed by the spring 100 a little way further into the cylinder 95, as a result of which the conical valve 101 opens and hence, when the piston rod 99 is retracted, the fluid can flow back through the channels 102 and 103 from space 96 into stroke chamber 98.

At the start of the next introduction of piston 92 due to tilting away from the upper terminal position of the tiltable instrument unit, the spring 100 is compressed by the piston rod 99, because the piston 92, due to its greater surface resisting the brake fluid 96, builds up a greater resistance in front of its end face 92a, so that the brake fluid can now flow away, without a significant braking action, from chamber 98 through the flow channel 97 to space 96 (FIG. 20).

At its tip, the mandrel portion 95 carries an extension 95a, which protrudes through a central opening in the end face 92a of the piston 92 and extends into a guide passage 94b provided in the end wall 94a of the cylinder 94. In the extension 95a, on which the piston 92 seats slidably, a split pin 140 prevents the piston 92 from sliding in the direction of the cylinder end wall 94a. Axial channels are provided in the bore 94b which, when the extension 95a moves into the bore 94b, permit the brake fluid contained in the said bore to escape backwards into the stroke chamber 98 (FIG. 22).

The right-hand shock absorber 91 serves to brake the arrival of the tilting device at the end of its downwards movement. For this purpose, the shock absorber is mounted on the right-hand side plate 61 by means of a flange 61a of the said side plate. The piston rod 99a of the piston 92 in the shock absorber 91 is connected by means of a strap 99b to a connecting member 123, which member is connected to the tilting lever 67 by the link joint 119 (FIG. 9). On tilting the said lever about the pivot bearing 63, the connecting member 123 moves forwards, i.e. towards the frontal plate 37, as a result of the downward tilting of the instrument unit 31, and hence draws the piston 92, via the strap 99b and the piston rod 99a, into the cylinder 95, resulting in the same braking action as has already been described in connection with the left-hand shock absorber 90 (FIGS. 8 and 18 to 22).

The tiltable instrument portion 31 comprises the two tilting rails 120 and 121 as well as a carrier device, shown in FIGS. 23 to 27, comprising the carrier bar 141, which consists of a front plate 142, which, with the instrument mounted on the head, runs transversely in front of the forehead of the user, and, an upper plate 143 which is joined to, and preferably integral with, the upper rim of the front plate 142 and is angled towards the head. At the left-hand end of the carrier part 141, the left-hand tilting rail 120 is pivotably mounted between two pivot pegs, of which only the upper peg 144 is visible in FIGS. 7 and 23, whilst at the right-hand end of the carrier part 141 the tilting rail 121 is pivotably attached between an upper pivot peg 146, protruding from the underside of the upper plate 143, and a lower pivot peg 147, which is located on an angle flange 148 which projects inwards at the lower end of the front plate 142 (FIGS. 24 and 26).

In order to prevent a whipping action of the two tilting rails 120 and 121, a cross-strutting arrangement is provided, comprising two wire or strip struts 150 and 151, which run below the upper plate 143, cross one another on the underside of the upper plate 143 and in the middle region thereof, and are hooked onto the holding studs 152 and 153 at the left-hand end of the upper plate 143 and onto the holding studs 154 and 155 at the right-hand end of the upper plate 143. Due to this cross-strutting, the two tilting rails 120 and 121 are always tilted through the same angle, relative to the carrier part 141, about the pivot pegs 144 and 146.

The housings 132 and 133 of instrument units 32 and 33 are attached near the two end regions of the front plate 142 and can each be adjusted to the particular distance of the eyes from the bridge of the nose of the user by means of an eye distance adjustment device using setting screws 156 and 157. As already described earlier, the entire head mounting is set relative to the bridge of the nose by means of the nose feeler 47.

The attachment of the housing 133 of the unit 33 to the front plate 142 in the right-hand end region thereof is shown in more detail in FIGS. 24 to 27. The inner end wall 201 of the housing 133 which faces the head is attached by means of a holding screw 158 to a carrier boss 160, which protrudes through a slit 161 in the front plate 142 and is provided, at its end remote from the housing 133, with a circular flange 162 which prevents the carrier boss 160 from falling outwards from the slit 161. Transversely to the middle axis of the boss, along which axis the holding screw 158 is screwed into the boss 160, the boss possesses a transverse bore 163, through which extends the threaded bolt 159 of the setting screw 157. This bolt is axially displaceably screwed, by means of its thickened portion located near the screw head 157a and carrying an external thread, into the orifice 164a, carrying an internal thread, of an angled bracket 164 of the front plate 142, whilst its end 159a remote from the screw head is axially displaceably carried in a holding bracket 165 which projects from the front plate 142. In its middle region, by which it projects through the bore 163 of the carrier boss 160, the threaded bolt 159 possesses an annular groove 166, into which projects a pin 167 screwed into the carrier boss 160 from the side of the flange 162, thereby preventing the threaded bolt 159 from shifting axially relative to the carrier boss 160, but permitting rotation of the threaded bolt 159 by means of the screw head 157a (FIGS. 24 to 26).

When the threaded bolt 159 is screwed outwards from the thread of the bore 164a in the bracket, by turning the screw head 157a, the carrier boss 160 follows the resulting axial shift to the right, relative to the head of the user, until it encounters the right-hand end 161a of the slit 161 in the front plate 142. As a result, the housing 133 of optical unit 33, which is fixed to the carrier boss 160, and the optics contained therein, are also shifted to the right in front of the face of the user.

If, conversely, the adjustment screw 157 is screwed into the internal thread of the bracket 164, the carrier boss 160, and the housing 133 of unit 33, located thereon, shifts to the left in front of the face of the user, and can be adjusted until the carrier boss 160 reaches the holding bracket 165 which is remote from the screw head.

In order to ensure secure, unshakable fastening of the housing 133 of unit 33 onto the front plate 142, three guide bolts 171, 172 and 173 are screwed into the front plate 142 from the side facing the forehead of the user, and are secured in position by means of lock nuts 174, 175 and 176.

The two guide bolts 171 and 172 project outwards from the front plate 142 above the carrier boss 160, whilst the guide bolt 173 is below the said carrier boss. The free ends 171a, 172a and 173a of the three guide bolts 171, 172 and 173 extend into corresponding guide grooves 177, 178 and 179 which are parallel to the lengthwise direction of slit 161, and thus secure the housing 33 of the optics against tilting whilst it is being axially shifted by means of the device, described above, for adjustment to the distance between the eyes.

The housing 133 of instrument unit 33 consists of a front part 200 and a back wall portion 201. These two parts are attached to one another along a common joint 200a by glueing, thermal welding or the like processes about a periphery defining their largest cross-sectional area. Thereby the housing parts 200 and 201 are well adapted for manufacture by injection molding and can be released from the mold without the need for expensive special measures.

In its portion projecting furthest away from back wall portion 201, front part 200 has a window 202 in a flat frontal end wall 203 from which a socket 205 projects forward surrounding a recess 203a into the bottom of which window 202 opens.

An objective lens 10 is placed over this recess 203a on the socket 205 and is held in place thereon by means of a retaining ring 206 which latter is attached to the socket 205 by an inner threading 207 screwed on the outer threading 204 of socket 205.

In the inside surface of the frontal end wall 203 below the window 202 thereof, there is provided in a thickened sill-like portion 208, a transverse groove 209 which runs parallel to the bottom 210 of the housing 133, pertaining to the front part 200, and into which is inserted the front edge 11a of the mirror 11. The lengthwise edge 11d of the mirror 11, which is the right-hand edge seen from the window 202 and is raised vis-a-vis the opposite mirror edge 11b, is inserted into the holding groove 211 of the rail 212, which rail is carried, via the support wall 213, by the bottom 210 of the front part 200. Since the edges 11a to 11d of the mirror 11 define a rhombus, the acute angles of which are located firstly between the edges 11a and 11d and secondly between the edges 11b and 11c, the lengthwise edge 11b is in a lower position than the lengthwise edge 11d. The lengthwise edge 11b of the mirror 11 is therefore inserted into a groove 214 which is located in a holding rail 215 carried by a support wall 216 which is lower than support wall 213. The mirror 11 is prevented from sliding out of the rails 212 and 214 by a bow spring 217, the means of support of which is described below. The bow spring 217 pushes the transverse edge 11a of the mirror 11 into the groove 209.

In order to permit easy ejection of the front part 200 from the mold if the part is manufactured by injection molding, the rails 212 and 214 and their support walls 213 and 216 are extended up to the frontal end wall 203 of the housing, in which they terminate, in the lower region thereof beneath the aperture 202, to the right and left of the latter.

The back wall portion 201 of the housing 133 accommodates the holding devices for the second mirror 12, the third mirror 13, the image field diaphragm 15, the field lens 16 and the fourth mirror 14, as well as the eye lens 20 of the ocular, and an adjusting device for the latter.

As shown in more detail in FIGS. 29, 30 and 31, the mirror 13 rests on two support knobs 221 and 222 as well as on a guiding and holding rail 223 possessing a support strip 224, all of which are injection-molded onto the back wall portion 201. The mirror 13 is securely held in its position on these support elements by a five-arm spring 225 and rests with its back lower edge 13x on the inner wall of the back wall part 201. The spring 225 is held in a guide rib 220 which projects inwards from the back wall part 201. The supporting pressure of the spring 225 is exerted by its two main arms 226 and 227 on two diagonally opposite corners between, respectively, the edges 13a and 13b, and the edges 13c and 13d, of the mirror 13. The function of the shorter, less pre-tensioned auxiliary arm of the spring 225 is merely to stabilize the already supported mirror 13 in its equilibrium position.

The point of counter-pressure of the spring 225 on the mirror 13 is somewhat to the side of the line connecting the above-mentioned support points of the main arms 226 and 227 with one another, in the direction toward the auxiliary arm 229, and, at this point of counter-pressure, the spring is supported against a flat step 230 at the end of the guide rib 220, which engages, with its higher inner portion 231, in a slit 232 of the spring 225 and thereby holds the spring in its side-to-side middle position. The position of the spring 225 and of the mirror 13 held by the spring is secured, in the direction of insertion of the mirror into its support position as shown in FIG. 29, by two angled spring fingers 233 and 234, of which the finger 233 presses elastically against the front edge 13d of the mirror 13 and holds the latter with its edge 13b resting against the inner wall of the back wall part 201 of the housing, whilst the spring 225 itself is held, and slightly flexed elastically, by means of the slightly outward-splayed finger 234, as a result of the latter resting against the end face 235a of a support wall 235 molded onto the front part 200 of the housing.

Figure 28:
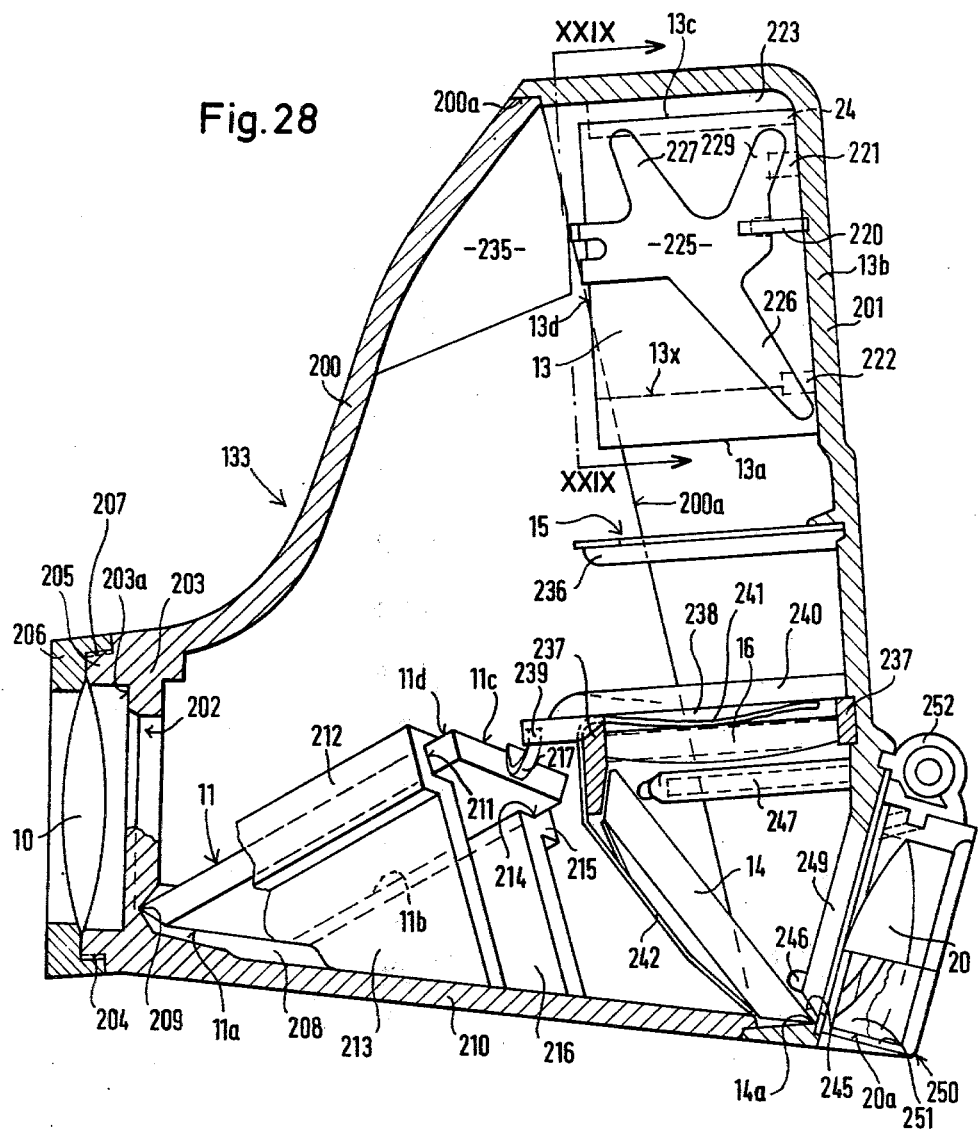
FIG. 28 shows a longitudinal section through the housing containing an optical system according to FIGS. 2 to 5 for the right eye.

On the inside of the back wall part 201, the image field diaphragm is held in a fork-shaped holder, molded onto the inner wall, of which only the left-hand prong 236 of the fork, viewed in the direction from the objective, can be seen in FIG. 28.

The field lens 16 rests in a ring frame 237, which in turn is inserted into two guide prongs which are molded onto the inner wall of the back wall part 201, and of which only the left-hand prong 238 can be seen in FIG. 28. The above mentioned spring bow 217 is fixed to the free end of the said prong 238 by means of a peg 239. On each of the two prongs 238, a lengthwise strip 240 projects slighly inwards, so that a leaf spring 241 can rest on the underside of this strip, whilst the upper, angled arm 241 of the said spring holds the field lens fixedly in its frame 237, whilst the other arm 242, running along the outside of the frame 237 and angled, at its lower end, slightly inwardly to the optical axis of the field lens, presses against the back of the fourth deviating mirror 14. This mirror is inserted by its lower transverse edge 14a in a transverse groove 245 at the base of the ocular window 249 and is pressed by the spring arm 242 against two holding pegs 245 and 246 which are integral with the inner wall of the back wall portion 201. The setting device 250 for the eye lens 20 of the ocular permits axial adjustment of the eye lens 20 without turning the latter, so that its straight cut-off edge 20a always forms the lower edge of the eye lens. For this purpose, the sideways position of the frame 251 is determined by the guide ring 252 only at its lower straight edge 251a and at the front part of its remaining periphery, whilst the frame 251 is additionally secured against rotation by a guide projection 253 which engages in the rim 251b of the frame. Within the guide ring 252, the open adjustment ring 254 engages round the frame 251, and is furthermore rotatably carried, by its outer periphery 254a, on the inside 252a of the guide ring 252 (FIG. 32).

On its inside, the adjustment ring 254 carries three projections 255, 255a and 255b, in the shape of a segment of a screw, which engage in corresponding grooves 256, 256a and 256b, again in the shape of a segment of a screw, on the curved outer face 251b of the frame 251. On turning the adjustment ring 254, the frame 251, which cannot turn, is forced, as a result of the travel of the projections 255, 255a and 255b in the screw segment grooves 256, 256a and 256b, to undergo an axial shift.

In order completely to avoid exerting any force, on the optical instrument suspended from the head of the user, which might shift this instrument from its middle position, the rotational movement of the adjustment ring 254 is effected by a worm transmission with a lateral actuating head 257. The actuation head is fixed to a threaded spindle 258 which carries a worm thread 259, the turns of which engage in a partial crown gear 260 provided on the outside of the adjustment ring 254.

In order to be able to adjust the threaded spindle 258 without any axial play, it has a fixed stop, in the form of an annular shoulder 261, only on the side which carries the actuating head 257, whilst the opposite stop is adjustable by means of the screw 262; on turning this screw 262 inwards, an initially heavily deformed washer 263 is stretched until a seat free from play is obtained. The resulting pressure friction at the same time secures the screw 262.

I claim:

1. Magnifying optical system comprising a head gear (30), a microscope (32,33) comprising an objective (10), an ocular having an eye lens (20) and a deflecting set (11 to 14) interposed between said objective (10) and said eye lens (20) and a counter weight (64) by means of which said microscope is suspended with balancing of the microscope weight, said microscope being rigidly connected with said head gear in such a position that an object field observed by the eye of a user wearing said head gear through said microscope can also be observed, in an unchanged position of the user's head, past the microscope by a mere changing of the viewing direction comprising the axis of the viewer's eye ball, and being guidable via said head gear (30) by a user's head;

said optical system further comprising an instrument part (31) comprising an adjusting device (122a,b) and provided at said head gear, by means of which adjusting device the distance of the user's pupil from said eye lens (20) is adjustable, while said counter weight (64) is rigidly connected with said instrument part (31), whereby said microscope, instrument part (31) and counter weight (34) constitute a swivel unit being mounted on said head gear for swivelling between two terminal positions, in one of which positions said eye lens (20) is in front of the user's eye at the aforesaid adjusted distance, while, in the other terminal position, the microscope is outside the vision field of the user;

said system also comprising damping means (50,51) adapted for damping the swivelling motion of said swivel unit while the latter approaches either one of said terminal positions, permitting swivelling of said swivel unit from one of said terminal positions into the other by a nod of the user's head;

and wherein said deflecting set is free from prisms.

2. The optical system of claim 1, wherein the deflecting system comprises a plurality of deflecting image-erecting elements which so deflect the central ray incident on the objective that it is deflected under an obtuse angle upwardly or downwardly out of a plane extending through the objective central ray which plane is also horizontal relative to the head of the observer.

3. The optical system of claim 2, wherein said eye lens of said ocular is cut away at its lower rim, forming a straight bottom edge thereof, sufficiently so that the change of view from direct sight of the object to sight through the ocular requires only a slight change in the position of the eyeball, and wherein the lower rim of the objective extends maximally down to the horizontal plane extending to the straight bottom edge of the ocular, but does not extend beneath the latter.

4. The optical system of claim 3, wherein the outer mantle of the ray-cone of free sight (whose apex is located in the pupil of the eye) barely touches the rims of the eye lens and of the objective.

5. The optical system of claim 4, wherein the eye lens of the ocular is cut-off straight on the side thereof touched by said ray-cone mantle whereby the angle of rotation of the eyeball when changing viewing direction is kept small.

6. The optical system of claim 3, wherein the objective is laterally displaced from the central line common to the ocular and to the eye regarding the latter.

7. The optical system of claim 6, wherein the lateral displacement of the objective relative to the ocular is only such that the difference of angles under which the observing eye views the object, directly by free sight, on the one hand, and magnified through the ocular, on the other hand, is not noticed to any practical degree by the observing person.

8. The optical system of claim 7, wherein the image-erecting deflecting elements comprise four mirror elements of which the mirror element receiving the central objective ray is in an oblique position such that the ray is deflected laterally outwardly and upwardly, from the viewpoint of the observing person, out of the plane which extends through the center of the objective and which is directed perpendicularly toward the observing person, and that the thus deflected ray (B) is directed by a second mirror element (12) under a right angle across the central objective ray (A) onto a third mirror element (13), from which it is directed perpendicularly downwardly into a plane which extends through the eye lens (20) of the ocular perpendicularly to the cut-off straight edge (20a) of said eye lens, said vertically downwardly directed ray passing through a field lens (16) of said ocular on to a fourth mirror element (14) which latter directs the ray under an obtuse angle taken in the last described plane, through the eye lens (20) of the ocular, wherein the objective (10) is so supported in the system that it receives a ray which deviates under a flat acute angle (Y-X) from the central ray which enters the regarding eye directly from the object's field, as the central objective ray (A), and wherein this central objective ray is so deflected by the deflecting system that it is so directed through the ocular (20) to the eye of the user that it arrives in the eye whenever a slight change of the viewing direction from a position of the eyeball viewing the objective's field directly to a position viewing the ocular is made by the user's eye ball.

9. The optical system of claim 8, wherein the intersecting angle between the optical axis of objective and the central ray of free sight, at the center of the observed object's field is from 3° to 20°.

10. A stereoscopically magnifying optical double system comprising two structurally equal specularly symmetrical systems as defined in claim 8, wherein the two oculars are disposed spacedly from the two eyes of the observing user, and wherein the two objectives are laterally displaced, outwardly from the central plane of the user's nose, relative to their respective oculars.

11. The double system of claim 10, wherein the distance of the two objectives from each other is only so much larger than the distance of the user's eyes from each other that the stereoscopic space-viewing (depth) effect is increased, but that this increase does not exceed the critical angle beyond which the merging of the two partial images seen by the observing eyes is no longer achieved.

12. The double system of claim 11, wherein at least one ocular comprises an adjusting device for the eye lens adapted for axially displacing the latter eye lens with its cut-off straight edge remaining in the same horizontal plane.

13. The double system of claim 12, wherein the adjusting device comprises a groove provided in the circumferential rim surface of a mounting about the curved rim of the eye lens, said groove extending helically relative to the central axis of the lens, as well as a setting ring having a plurality of inwardly directed cams engaging said groove.

14. The optical system of claim 1, wherein said holding device comprises sensor means (47) adapted for contacting a determined user's nose and thereby permitting re-seating said holding device onto a determined user's head, after initial adaptation thereto, in a predetermined positioning as to height and sides.

15. The optical system of claim 14, wherein said headgear (30) comprises a front headband (35) and said sensor means (47) comprise a feeler extending downwardly from the central region of front headband (35) and bearing at its lower end an arcuate member (47a) adapted for lightly touching the arch of the user's nose when re-seating the headgear (30) on the user's head.

16. The optical system of claim 1, wherein said instrument part 31 comprises abutting means (110,114) for arresting said instrument in an upper (106) and lower (109) terminal position in front and slightly below of the central region of said front headband (35).

17. The optical system of claim 16, wherein said abutting means comprise stabilizing spring means biassing said instrument into either one of the said terminal positions.

18. The optical system of claim 16, wherein said instrument part comprises damping means increasingly damping the tilting movement of said instrument unit out of said labile equilibrium toward a desired terminal position.

19. The optical system of claim 18, wherein said damping means are shock absorbers comprising braking pistons and cylinders as well as channels for a braking fluid ahead of said pistons in said cylinders, said channels being so devised that their free cross-sectional areas decrease as one of said braking pistons moves into a braking cylinder associated therewith.

20. The optical system of claim 19, wherein said braking pistons and cylinders are of frustoconical shape, whereby the front end of each piston and the end wall of each cylinder facing said front end both represent the smaller terminal faces of a frustocone.

21. The optical system of claim 1, wherein each braking piston (92), has a central passage (102) and a spring biassed pin (95) protruding into said central passage (102) from the rear end of said piston, towards and out of the piston front face (82a), and adapted for sealingly engaging a valve seat (101) provided in said central passage (102), when in closing position.

22. The optical system of claim 16, wherein said swivel unit comprises arresting means adapted for arresting said instrument part in said upper or said lower terminal position.

* * * * *